United States Patent
St. John et al.

(10) Patent No.: US 10,301,198 B2
(45) Date of Patent: May 28, 2019

(54) SELECTIVE RETENTION OF MULTIVALENT IONS

(71) Applicant: Gradiant Corporation, Woburn, MA (US)

(72) Inventors: Maximus G. St. John, Boston, MA (US); Looh Tchuin Choong, Somerville, MA (US); Prakash Narayan Govindan, Melrose, MA (US)

(73) Assignee: Gradiant Corporation, Woburn, MA (US)

( * ) Notice: Subject to any disclaimer, the term of this patent is extended or adjusted under 35 U.S.C. 154(b) by 0 days.

(21) Appl. No.: 15/752,619

(22) PCT Filed: Aug. 12, 2016

(86) PCT No.: PCT/US2016/046709
§ 371 (c)(1),
(2) Date: Feb. 14, 2018

(87) PCT Pub. No.: WO2017/030932
PCT Pub. Date: Feb. 23, 2017

(65) Prior Publication Data
US 2018/0244545 A1 Aug. 30, 2018

Related U.S. Application Data

(60) Provisional application No. 62/205,633, filed on Aug. 14, 2015.

(51) Int. Cl.
*B01D 39/00* (2006.01)
*C02F 1/44* (2006.01)
(Continued)

(52) U.S. Cl.
CPC .............. *C02F 1/441* (2013.01); *B01D 61/58* (2013.01); *C02F 1/442* (2013.01); *C02F 1/445* (2013.01);
(Continued)

(58) Field of Classification Search
CPC ........ B01D 25/02; B01D 25/08; B01D 39/00; B01D 39/14; B01D 39/16; B01D 39/20;
(Continued)

(56) References Cited

U.S. PATENT DOCUMENTS 2,151,990 A 3/1939 Ruys
2,606,820 A 8/1952 Viggo
(Continued)

FOREIGN PATENT DOCUMENTS

CA 2779732 A1 12/2012
CA 2818055 11/2013
(Continued)

OTHER PUBLICATIONS

International Search Report and Written Opinion for PCT/US16/46709 dated Dec. 28, 2016.
(Continued)

*Primary Examiner* — Allison G Fitzsimmons
(74) *Attorney, Agent, or Firm* — Wolf, Greenfield & Sacks, P.C.

(57) ABSTRACT

Disclosed herein are systems and methods in which multivalent ions are selectively retained in an aqueous stream. According to certain embodiments, multiple separations may be used to process an aqueous feed stream containing solubilized monovalent ions and solubilized multivalent ions to produce a stream enriched in the solubilized multivalent ions. The separations may be arranged, according to certain embodiments, to enhance the overall separation process such that the product stream contains—relative to
(Continued)

the initial aqueous feed stream—a high amount of solubilized multivalent ions, a high amount of water from the aqueous feed stream, and/or a high ratio of solubilized multivalent ions to solubilized monovalent ions.

9 Claims, 10 Drawing Sheets

(51) Int. Cl.
    *B01D 61/58*     (2006.01)
    *C02F 1/469*     (2006.01)
    *B01D 61/00*     (2006.01)
    *B01D 61/02*     (2006.01)

(52) U.S. Cl.
    CPC .......... *C02F 1/4695* (2013.01); *B01D 61/002* (2013.01); *B01D 61/025* (2013.01); *B01D 61/027* (2013.01); *B01D 2311/25* (2013.01); *B01D 2317/025* (2013.01); *B01D 2317/06* (2013.01); *B01D 2319/06* (2013.01); *C02F 2209/03* (2013.01)

(58) Field of Classification Search
    CPC ...... B01D 61/00; B01D 61/002; B01D 61/02; B01D 61/022; B01D 61/027; B01D 61/08; B01D 63/00; B01D 63/08; B01D 63/10; B01D 63/12; B01D 63/14; B01D 2319/02; B01D 2319/04; B01D 2319/06; C02F 1/00; C02F 1/001; C02F 1/44; C02F 1/441; C02F 1/442; C02F 1/445; C02F 2201/00; C02F 2201/002; C02F 2301/046
    USPC ....... 210/790, 805, 635, 641, 650, 651, 652, 210/314, 315, 321.64, 321.72, 321.75, 210/322, 340, 500.21
    See application file for complete search history.

(56) References Cited

U.S. PATENT DOCUMENTS

| | | |
|---|---|---|
| 2,606,839 A | 8/1952 | Evans |
| 2,640,018 A | 5/1953 | Heath |
| 2,997,856 A | 8/1961 | Pike |
| 3,032,482 A | 5/1962 | Shoemaker |
| 3,042,606 A | 7/1962 | Salutsky et al. |
| 3,080,302 A | 3/1963 | Rogers et al. |
| 3,236,747 A | 2/1966 | Margiloff |
| 3,331,773 A | 7/1967 | Gunderson et al. |
| 3,454,490 A | 7/1969 | Wallace |
| 3,489,652 A | 1/1970 | Williamson |
| 3,625,761 A | 12/1971 | Tate |
| 3,725,209 A | 4/1973 | Rosa |
| 3,906,250 A | 9/1975 | Loeb |
| 3,922,154 A | 11/1975 | Kawasaki et al. |
| 3,926,739 A | 12/1975 | Izumi |
| 4,156,645 A | 5/1979 | Bray |
| 4,224,148 A | 9/1980 | Lindman et al. |
| 4,251,367 A | 2/1981 | Santora |
| 4,312,755 A | 1/1982 | Hwang |
| 4,334,886 A | 6/1982 | Tani et al. |
| 4,452,696 A | 6/1984 | Lopez |
| 4,511,436 A | 4/1985 | El Din et al. |
| 4,563,337 A | 1/1986 | Kim |
| 4,576,724 A | 3/1986 | Colman et al. |
| 4,708,805 A | 11/1987 | D'Muhala |
| 4,735,722 A | 4/1988 | Krepak |
| 4,755,298 A | 7/1988 | Grinstead |
| 4,770,775 A | 9/1988 | Lopez |
| 4,806,244 A | 2/1989 | Guilhem |
| 4,832,115 A | 5/1989 | Albers et al. |
| 4,843,828 A | 7/1989 | Gladman |
| 4,944,882 A | 7/1990 | Ray et al. |
| 4,956,157 A | 9/1990 | Nasu |
| 4,973,201 A | 11/1990 | Paul et al. |
| 4,980,077 A | 12/1990 | Morris et al. |
| 4,981,593 A | 1/1991 | Priestley et al. |
| 5,015,391 A | 5/1991 | Mohn |
| 5,053,132 A * | 10/1991 | Sirkar .................. B01D 61/246 210/500.21 |
| 5,123,481 A | 6/1992 | Albers et al. |
| 5,167,828 A | 12/1992 | Emmons et al. |
| 5,190,656 A | 3/1993 | Paul et al. |
| 5,225,087 A | 7/1993 | Kardos |
| 5,238,574 A | 8/1993 | Kawashima et al. |
| 5,250,185 A | 10/1993 | Tao et al. |
| 5,282,995 A | 2/1994 | Paul et al. |
| 5,328,616 A | 7/1994 | Martyak et al. |
| 5,425,902 A | 6/1995 | Miller et al. |
| 5,453,205 A | 9/1995 | Browne |
| 5,464,540 A | 11/1995 | Friesen et al. |
| 5,656,161 A | 8/1997 | Solomon et al. |
| 5,840,195 A | 11/1998 | Delsalle et al. |
| 6,010,631 A | 1/2000 | Delsalle et al. |
| 6,056,878 A * | 5/2000 | Tessier .................. B01D 61/48 204/524 |
| 6,062,070 A | 5/2000 | Maltby et al. |
| 6,113,797 A | 9/2000 | Al-Samadi |
| 6,146,525 A | 11/2000 | Li et al. |
| 6,187,200 B1 | 2/2001 | Yamamura et al. |
| 6,190,556 B1 | 2/2001 | Uhlinger |
| 6,270,671 B1 | 8/2001 | Shorr et al. |
| 6,319,409 B1 | 11/2001 | Saitou et al. |
| 6,416,668 B1 | 7/2002 | Al-Samadi et al. |
| 6,423,235 B1 | 7/2002 | Shimoi et al. |
| 6,440,310 B1 | 8/2002 | Shorr et al. |
| 6,461,514 B1 | 10/2002 | Al-Samadi |
| 6,508,936 B1 | 1/2003 | Hassan |
| 6,582,605 B2 | 6/2003 | Krulik et al. |
| 6,699,369 B1 | 3/2004 | Hartman et al. |
| 6,730,234 B2 | 5/2004 | Symens et al. |
| 6,783,682 B1 | 8/2004 | Awerbuch |
| 6,817,476 B2 | 11/2004 | Donnick et al. |
| 6,919,000 B2 | 7/2005 | Klausner et al. |
| 7,022,240 B2 | 4/2006 | Hart et al. |
| 7,048,852 B2 | 5/2006 | Ballard |
| 7,115,670 B2 | 10/2006 | Hensman et al. |
| 7,141,171 B2 | 11/2006 | Lightfoot |
| 7,225,620 B2 | 6/2007 | Klausner et al. |
| 7,306,437 B2 | 12/2007 | Hauge |
| 7,316,080 B1 | 1/2008 | Woolsey |
| 7,459,084 B2 | 12/2008 | Baig et al. |
| 7,459,088 B2 | 12/2008 | Davis |
| 7,465,376 B2 | 12/2008 | Neubert et al. |
| 7,510,656 B2 | 3/2009 | Shafer et al. |
| 7,520,993 B1 | 4/2009 | Laraway et al. |
| 7,527,726 B2 | 5/2009 | Slough et al. |
| 7,597,784 B2 | 10/2009 | Bednarek et al. |
| 7,678,235 B2 | 3/2010 | Deep et al. |
| 7,718,069 B2 | 5/2010 | Laraway et al. |
| 7,726,398 B2 | 6/2010 | Collins et al. |
| 7,727,400 B2 | 6/2010 | Flynn |
| 7,731,847 B2 | 6/2010 | Ton That |
| 7,815,804 B2 | 10/2010 | Nagghappan |
| 7,824,552 B2 | 11/2010 | Slabaugh et al. |
| 7,950,921 B1 | 5/2011 | Woolsey |
| 7,964,101 B2 | 6/2011 | Slough et al. |
| 8,012,358 B2 | 9/2011 | Slabaugh et al. |
| 8,043,509 B2 | 10/2011 | Thiers |
| 8,119,007 B2 | 2/2012 | Bajpayee et al. |
| 8,147,696 B1 | 4/2012 | Pandya |
| 8,197,693 B2 | 6/2012 | Al-Juil |
| 8,216,473 B2 | 7/2012 | Wohlert |
| 8,252,092 B2 | 8/2012 | Govindan et al. |
| 8,292,272 B2 | 10/2012 | Elsharqawy et al. |
| 8,366,924 B2 | 2/2013 | Vuong |
| 8,469,092 B2 | 6/2013 | Curole et al. |
| 8,496,234 B1 | 7/2013 | Govindan et al. |
| 8,501,007 B2 | 8/2013 | Bajpayee et al. |
| 8,523,985 B2 | 9/2013 | Govindan et al. |
| 8,562,824 B2 | 10/2013 | Thiers et al. |

(56) References Cited

U.S. PATENT DOCUMENTS

| | | |
|---|---|---|
| 8,647,477 B2 | 2/2014 | Govindan et al. |
| 8,678,080 B2 | 3/2014 | Curole et al. |
| 8,679,347 B2 | 3/2014 | Al-Samadi |
| 8,695,343 B2 | 4/2014 | Moe |
| 8,727,325 B2 | 5/2014 | Sparrow et al. |
| 8,771,477 B2 | 7/2014 | Thiers |
| 8,778,065 B2 | 7/2014 | Govindan et al. |
| 8,794,320 B2 | 8/2014 | Ayirala et al. |
| 8,820,723 B1 | 9/2014 | Sparrow et al. |
| 8,840,792 B2 | 9/2014 | Wohlert |
| 8,857,798 B1 | 10/2014 | Sparrow et al. |
| 8,889,000 B2 | 11/2014 | Hannemann et al. |
| 8,980,100 B2 | 3/2015 | Chidambaran |
| 8,999,172 B1 | 4/2015 | Zuback |
| 9,072,984 B2 | 7/2015 | Govindan et al. |
| 9,079,117 B2 | 7/2015 | Govindan et al. |
| 9,085,971 B2 | 7/2015 | Janssen et al. |
| 9,120,033 B2 | 9/2015 | Govindan et al. |
| 9,206,060 B1 | 12/2015 | Abusharkh |
| 9,221,694 B1 | 12/2015 | Govindan et al. |
| 9,266,748 B1 | 2/2016 | Govindan et al. |
| 9,266,762 B2 | 2/2016 | Wang et al. |
| 9,427,705 B1 | 8/2016 | Abusharkh |
| 9,428,404 B2 | 8/2016 | Bajpayee et al. |
| 9,550,685 B2 | 1/2017 | Klausner et al. |
| 9,556,041 B2 | 1/2017 | Govindan et al. |
| 9,617,179 B2 | 4/2017 | Govindan et al. |
| 9,700,811 B2 | 7/2017 | Govindan et al. |
| 9,957,180 B2 | 5/2018 | Govindan et al. |
| 9,969,638 B2 | 5/2018 | Govindan et al. |
| 2003/0106860 A1 | 6/2003 | Peloquin et al. |
| 2003/0132166 A1 | 7/2003 | Rey |
| 2004/0187897 A1 | 9/2004 | Kenowski et al. |
| 2005/0023222 A1 | 2/2005 | Baillie |
| 2006/0150892 A1 | 7/2006 | Mayer |
| 2006/0157409 A1 | 7/2006 | Hassan |
| 2006/0157410 A1 | 7/2006 | Hassan |
| 2007/0012556 A1 | 1/2007 | Lum et al. |
| 2007/0068791 A1 | 3/2007 | Thom et al. |
| 2007/0080113 A1 | 4/2007 | Vuong |
| 2007/0084713 A1 | 4/2007 | Deep et al. |
| 2007/0102359 A1 | 5/2007 | Lombardi et al. |
| 2007/0131428 A1 | 6/2007 | den Boestert et al. |
| 2007/0181480 A1 | 8/2007 | Lee |
| 2007/0235391 A1 | 10/2007 | Ylikangas et al. |
| 2008/0073200 A1 | 3/2008 | Godshall et al. |
| 2008/0102119 A1 | 5/2008 | Grovender |
| 2008/0116134 A1 | 5/2008 | Cartwright |
| 2008/0121585 A1 | 5/2008 | Mavis |
| 2008/0277344 A1 | 11/2008 | Sengupta et al. |
| 2009/0020289 A1 | 1/2009 | Sharif |
| 2009/0032446 A1 | 2/2009 | Wiemers et al. |
| 2009/0101490 A1 | 4/2009 | Thiers |
| 2009/0101587 A1 | 4/2009 | Blokker et al. |
| 2009/0127210 A1 | 5/2009 | Swisher |
| 2009/0173096 A1 | 7/2009 | Wohlert |
| 2009/0194272 A1 | 8/2009 | Baillie |
| 2009/0218210 A1 | 9/2009 | Demmons et al. |
| 2009/0277634 A1 | 11/2009 | Case et al. |
| 2009/0277640 A1 | 11/2009 | Thompson et al. |
| 2009/0277641 A1 | 11/2009 | Walters et al. |
| 2009/0308820 A1 | 12/2009 | Thiers et al. |
| 2010/0032377 A1 | 2/2010 | Wohlert |
| 2010/0163471 A1 | 7/2010 | Elyanow et al. |
| 2010/0163472 A1 | 7/2010 | Thiers et al. |
| 2010/0234795 A1* | 9/2010 | Wallenas .......... A61M 1/1696 604/29 |
| 2010/0242995 A1 | 9/2010 | Xiong et al. |
| 2010/0282675 A1 | 11/2010 | Sengupta et al. |
| 2010/0314238 A1 | 12/2010 | Frolov et al. |
| 2011/0017677 A1 | 1/2011 | Evans |
| 2011/0024354 A1 | 2/2011 | Xia et al. |
| 2011/0056822 A1 | 3/2011 | Elsharqawy et al. |
| 2011/0056878 A1 | 3/2011 | Matsushiro et al. |
| 2011/0094965 A1 | 4/2011 | Al-Samadi |
| 2011/0108484 A1 | 5/2011 | Liberman et al. |
| 2011/0114558 A1 | 5/2011 | Al-Mayahi et al. |
| 2011/0120157 A1 | 5/2011 | Wohlert |
| 2011/0155666 A1 | 6/2011 | Prakash et al. |
| 2011/0180479 A1 | 7/2011 | Cordatos et al. |
| 2011/0198285 A1 | 8/2011 | Wallace |
| 2011/0215039 A1 | 9/2011 | Acernese et al. |
| 2011/0233137 A1 | 9/2011 | Cath et al. |
| 2011/0257788 A1 | 10/2011 | Wiemers et al. |
| 2011/0303607 A1 | 12/2011 | Vora et al. |
| 2011/0306525 A1 | 12/2011 | Lighthelm |
| 2012/0012005 A1 | 1/2012 | Burke |
| 2012/0012511 A1 | 1/2012 | Kim et al. |
| 2012/0037568 A1 | 2/2012 | Karrs et al. |
| 2012/0067819 A1 | 3/2012 | McGinnis |
| 2012/0067820 A1 | 3/2012 | Henthorne et al. |
| 2012/0090833 A1 | 4/2012 | Ligthelm et al. |
| 2012/0091061 A1 | 4/2012 | Al-Jlil |
| 2012/0125603 A1 | 5/2012 | Willingham et al. |
| 2012/0125611 A1 | 5/2012 | Ayirala et al. |
| 2012/0125861 A1 | 5/2012 | Thiers |
| 2012/0145635 A1 | 6/2012 | Lucas, III et al. |
| 2012/0199524 A1 | 8/2012 | Bly et al. |
| 2012/0199534 A1 | 8/2012 | Holtzapple et al. |
| 2012/0205307 A1 | 8/2012 | Boudinar |
| 2012/0227975 A1 | 9/2012 | Ayirala et al. |
| 2012/0234664 A1 | 9/2012 | Nicoll |
| 2012/0234765 A1 | 9/2012 | Sengupta et al. |
| 2012/0267307 A1 | 10/2012 | McGinnis |
| 2012/0273417 A1 | 11/2012 | McGinnis et al. |
| 2012/0273422 A1 | 11/2012 | Wohlert |
| 2012/0279396 A1 | 11/2012 | Brammer et al. |
| 2012/0285886 A1 | 11/2012 | Liberman |
| 2012/0292259 A1 | 11/2012 | Marcin |
| 2012/0312755 A1 | 12/2012 | Ryan et al. |
| 2012/0318729 A1 | 12/2012 | Yip et al. |
| 2013/0008079 A1 | 1/2013 | Chung et al. |
| 2013/0043190 A1 | 2/2013 | Al-Samadi et al. |
| 2013/0056193 A1 | 3/2013 | Thiers |
| 2013/0074694 A1 | 3/2013 | Govindan et al. |
| 2013/0075098 A1 | 3/2013 | Janjua et al. |
| 2013/0075940 A1 | 3/2013 | Govindan et al. |
| 2013/0087501 A1 | 4/2013 | Moe et al. |
| 2013/0092622 A1 | 4/2013 | Kas et al. |
| 2013/0092626 A1 | 4/2013 | Zimmerman et al. |
| 2013/0105323 A1 | 5/2013 | Averbeck et al. |
| 2013/0118887 A1 | 5/2013 | Frolov et al. |
| 2013/0193074 A1 | 8/2013 | Voigt et al. |
| 2013/0199921 A1 | 8/2013 | McGovern |
| 2013/0213892 A1 | 8/2013 | Henthorne |
| 2013/0233786 A1 | 9/2013 | Posa |
| 2013/0240442 A1 | 9/2013 | Chidambaran et al. |
| 2013/0256228 A1 | 10/2013 | Bharwada et al. |
| 2013/0318743 A1 | 12/2013 | Chinta et al. |
| 2014/0008291 A1 | 1/2014 | Tang et al. |
| 2014/0021135 A1 | 1/2014 | Sawyer et al. |
| 2014/0041856 A1 | 2/2014 | Janssen et al. |
| 2014/0042058 A1 | 2/2014 | Janssen et al. |
| 2014/0042061 A1 | 2/2014 | Wallace |
| 2014/0061022 A1 | 3/2014 | Passarelli |
| 2014/0067958 A1 | 3/2014 | Bradley et al. |
| 2014/0069821 A1 | 3/2014 | Marcin et al. |
| 2014/0116956 A1 | 5/2014 | Yuan et al. |
| 2014/0151300 A1 | 6/2014 | Savage et al. |
| 2014/0197022 A1 | 7/2014 | Antar et al. |
| 2014/0197029 A1 | 7/2014 | Sparrow et al. |
| 2014/0246368 A1 | 9/2014 | Neubrand et al. |
| 2014/0263055 A1 | 9/2014 | Govindan et al. |
| 2014/0263081 A1 | 9/2014 | Thiers |
| 2014/0299462 A1 | 10/2014 | Thiers |
| 2014/0339162 A1 | 11/2014 | Cao et al. |
| 2014/0367871 A1 | 12/2014 | Govindan et al. |
| 2015/0013987 A1 | 1/2015 | Underwood et al. |
| 2015/0014248 A1 | 1/2015 | Herron et al. |
| 2015/0053619 A1 | 2/2015 | Cao et al. |
| 2015/0060286 A1 | 3/2015 | Govindan et al. |
| 2015/0060360 A1 | 3/2015 | Motherway et al. |
| 2015/0083577 A1 | 3/2015 | Govindan et al. |
| 2015/0083656 A1 | 3/2015 | Williams |

(56) References Cited

U.S. PATENT DOCUMENTS

| | | | |
|---|---|---|---|
| 2015/0107840 A1 | 4/2015 | Ligthelm et al. | |
| 2015/0107841 A1 | 4/2015 | Suijkerbuijk et al. | |
| 2015/0129410 A1 | 5/2015 | Govindan et al. | |
| 2015/0353397 A1* | 12/2015 | Cath | C02F 3/308 |
| | | | 210/195.1 |
| 2016/0001235 A1 | 1/2016 | Frisk | |
| 2016/0040522 A1 | 2/2016 | Jacob et al. | |
| 2016/0137526 A1 | 5/2016 | Govindan et al. | |
| 2016/0228795 A1 | 8/2016 | St. John et al. | |
| 2016/0229705 A1 | 8/2016 | St. John et al. | |
| 2016/0244349 A1 | 8/2016 | St. John et al. | |
| 2016/0339354 A1 | 11/2016 | Govindan et al. | |
| 2016/0339356 A1 | 11/2016 | Govindan et al. | |
| 2016/0339357 A1 | 11/2016 | Govindan et al. | |
| 2016/0339390 A1 | 11/2016 | Abusharkh | |
| 2017/0036171 A1 | 2/2017 | Lienhard et al. | |
| 2017/0044033 A1 | 2/2017 | Lienhard et al. | |
| 2017/0144906 A1 | 5/2017 | Andrews et al. | |
| 2017/0174543 A1 | 6/2017 | Govindan et al. | |
| 2018/0008919 A1 | 1/2018 | Tierney, III et al. | |
| 2018/0036682 A1 | 2/2018 | Nicoll et al. | |
| 2018/0104649 A1 | 4/2018 | Govindan et al. | |
| 2018/0236372 A1 | 8/2018 | Govindan et al. | |
| 2018/0236406 A1 | 8/2018 | St. John et al. | |

FOREIGN PATENT DOCUMENTS

| | | |
|---|---|---|
| CA | 2821453 | 1/2014 |
| CA | 2816746 | 4/2014 |
| CA | 2821458 | 7/2014 |
| CN | 1623936 A | 6/2005 |
| CN | 1856447 A | 11/2006 |
| CN | 100999364 A | 7/2007 |
| CN | 101056693 A | 10/2007 |
| CN | 101397152 A | 4/2009 |
| CN | 101636354 A | 1/2010 |
| CN | 101717161 A | 6/2010 |
| CN | 102143786 A | 8/2011 |
| CN | 102438957 A | 5/2012 |
| CN | 102725236 A | 10/2012 |
| CN | 102933507 A | 2/2013 |
| DE | 2145861 A1 | 9/1972 |
| EP | 0 207 390 | 1/1987 |
| EP | 0 253 287 A1 | 1/1988 |
| EP | 0 623 561 A1 | 11/1994 |
| EP | 1775267 A2 | 4/2007 |
| FR | 1582201 A | 9/1969 |
| FR | 2561637 A1 | 9/1985 |
| GB | 821939 A | 10/1959 |
| GB | 1013767 A | 12/1965 |
| GB | 1036920 A | 7/1966 |
| GB | 1444241 A | 7/1976 |
| GB | 2395946 A | 6/2004 |
| JP | S55-147199 | 11/1980 |
| JP | H05-208199 A | 8/1993 |
| JP | 2018-001111 A | 1/2018 |
| KR | 101229482 B1 | 2/2013 |
| WO | WO 1995/027683 | 10/1995 |
| WO | WO 2000/000273 A1 | 1/2000 |
| WO | WO 01/14256 A1 | 3/2001 |
| WO | WO 02/32813 A1 | 4/2002 |
| WO | WO 2005/012185 | 2/2005 |
| WO | WO 2007/128062 | 11/2007 |
| WO | WO 2007/132477 A1 | 11/2007 |
| WO | WO 2007/138327 A1 | 12/2007 |
| WO | WO 2007/144591 A1 | 12/2007 |
| WO | WO 2008/137082 A1 | 11/2008 |
| WO | WO 2010/026589 A1 | 3/2010 |
| WO | WO 2010/118425 A1 | 10/2010 |
| WO | WO 2010/122336 A2 | 10/2010 |
| WO | WO 2010/131251 A2 | 11/2010 |
| WO | WO 2010/135561 A2 | 11/2010 |
| WO | WO 2011/159743 A1 | 12/2011 |
| WO | WO 2012/138502 A1 | 10/2012 |
| WO | WO 2012/142396 A1 | 10/2012 |
| WO | WO 2012/159203 | 11/2012 |
| WO | WO 2013/012548 A1 | 1/2013 |
| WO | WO 2013/037047 | 3/2013 |
| WO | WO 2013/078124 A1 | 5/2013 |
| WO | WO 2013/158315 A1 | 10/2013 |
| WO | WO 2013/159220 | 10/2013 |
| WO | WO 2014/058696 A1 | 4/2014 |
| WO | WO 2014/088826 A1 | 6/2014 |
| WO | WO 2014/121153 | 8/2014 |
| WO | WO 2014/144778 A1 | 9/2014 |
| WO | WO 2014/150848 A1 | 9/2014 |
| WO | WO 2014/162094 | 10/2014 |
| WO | WO 2014/188450 A1 | 11/2014 |
| WO | WO 2014/200829 | 12/2014 |
| WO | WO 2015/021062 | 2/2015 |
| WO | WO 2015/038983 | 3/2015 |
| WO | WO 2015/042584 | 3/2015 |
| WO | WO 2015/061194 A1 | 4/2015 |
| WO | WO 2017/019944 A1 | 2/2017 |
| WO | WO 2017/030932 A1 | 2/2017 |
| WO | WO 2017/030937 A1 | 2/2017 |
| WO | WO 2017/030941 A1 | 2/2017 |
| WO | WO 2017/044645 A1 | 3/2017 |
| WO | WO 2017/044668 A1 | 3/2017 |
| WO | WO 2017/127607 A1 | 7/2017 |
| WO | WO 2017/147113 A1 | 8/2017 |
| WO | WO 2018/075637 A1 | 4/2018 |

OTHER PUBLICATIONS

International Preliminary Report on Patentability for PCT/US16/46709 dated Mar. 1, 2018.

[No Author Listed], Accepta 4360 Material Safety Data Sheet. Accepta Ltd. Manchester, UK. Jul. 19, 2011. 5 pages.

[No Author Listed], Caustic Soda 50% Material Safety Data Sheet. Univar. Redmond, Washington. Apr. 8, 2013. 10 pages.

[No Author Listed], Color Removal Using Ozone. Spartan Environmental Technologies Air and Water Treatment—Technical Bulletin. Available Jul. 21, 2006. Last accessed Mar. 2, 2017 from <http://www.spartanwatertreatment.com/ozone-color-removal.html>.

[No Author Listed], Everything you want to know about Coagulation & Flocculation. Chapter 1: The Electrokinetic Connection. Zeta-Meter, Inc. Staunton, VA. 4th Edition. 1993:1-8.

[No Author Listed], F0 Plant Completes 1-Year of Operation. Water Desalination Report Nov. 15, 2010:2 pages.

[No Author Listed], Hi-Cal Hydrate Material Safety Data Sheet. Chemical Lime Co. Fort Worth, Texas. May 1, 2008. 6 pages.

[No Author Listed], Polyaluminum Chloride Solution Material Safety Data Sheet. GEO Specialty Chemicals, Ltd. Little Rock, Arkansas Mar. 12, 2015. 11 pages.

[No Author Listed], Servco 1010 Material Safety Data Sheet. Servco Chemicals. Lubbock, Texas. Aug. 7, 2013. 4 pages.

[No Author Listed], Soda Ash Material Safety Data Sheet. Univar. Redmond, Washington. Apr. 7, 2003. 10 pages.

Achilli et al., Selection of inorganic-based draw solutions for forward osmosis applications. Journal of Membrane Science. 2010;364:233-41. Epub Aug. 14, 2010.

Akram et al., Energy Utilization of Brine from an MSF Desalination Plant by Pressure Retarded Osmosis. The International Desalination Association World Congress on Desalination and Water Reuse. Tianjin, China Oct. 2013. 12 pages.

Al-Hallaj et al., Solar desalination with a humidification-dehumidification cycle: performance of the unit. Desalination. 1998;120:273-80.

Alshakhs, Modifying Water Salinity to Improve Oil Recovery. Stanford Academic Report. Oct. 29, 2013. Last accessed on Dec. 8, 2016 at <http://large.stanford.edu/courses/2013/ph240/alshakhs1/>. 2 pages.

Aramco, Saudi Aramco's 'Smart Water' May Aid Oil Production. Rigzone. Jul. 29, 2009. <http://www.rigzone.com/news/article_pf.asp?a_id=78707> Last accessed Jul. 30, 2015. 1 page.

(56) References Cited

OTHER PUBLICATIONS

Arthur et al., Technical Summary of Oil & Gas Produced Water Treatment Technologies. All Consulting, LLC (Mar. 2005). Last accessed on Dec. 21, 2016 from <http://dvikan.no/ntnu-studentserver/reports/ALLConsulting-WaterTreatmentOptionsReport.pdf>. 53 pages.

Banchik et al., Thermodynamic Analysis of a Reverse Osmosis Desalination System Using Forward Osmosis for Energy Recovery. Proceedings of the ASME 2012 International Mechanical Engineering Congress & Exposition. American Society of Mechanical Engineers. Houston, Texas. Nov. 9-15, 2012. 13 pages.

Burk, New Technology Spotlight. CaribDA News. 2012 Fall;2(4):6-7.

Cath et al., A Novel Hybrid Forward Osmosis Process for Drinking Water Augmentation Using Impaired Water and Saline Water Sources. WERC and Water Research Foundation. 2009:84 pages.

Chung et al., Forward osmosis processes: Yesterday, today and tomorrow. Desalination. 2012;287:78-81. Epub Jan. 11, 2011.

El-Dessouky et al., Multiple-effect evaporation desalination systems: thermal analysis. Desalination. 1999;125:259-76.

Ge et al., Exploration of polyelectrolytes as draw solutes in forward osmosis processes. Water Research 2012;46:1318-26. Epub Dec. 27, 2011.

Global Water Intelligence, Water Desalination Report. Tom Pankratz, ed. Dec. 17, 2012;48(48):1-4.

Govindan, Thermal Design of Humidification Dehumidification Systems for Affordable and Small-scale Desalination. Doctoral Thesis. Massachusetts Institute of Technology. Sep. 2012 286 pages.

Gude, Energy consumption and recovery in reverse osmosis. Desalination and Water Treatment. 2011;36(1-3):239-60.

Huang et al., The bridging force between colloidal particles in a polyelectrolyte solution. Langmuir. Nov. 27, 2012;28(47):16300-5. doi:10.1021/la303918p.

Khayet et al., Determination of surface and bulk pore sizes of flat-sheet and hollow-fiber membranes by atomic force microscopy, gas permeation and solute transport methods. Desalination. 2003;158:57-64.

Kim et al., Effect of PEG additive on membrane formation by phase inversion. Journal of Membrane Science. 1998;138:153-63.

Klausner et al., Evaporative heat and mass transfer for the diffusion driven desalination process. Heat Mass Transfer. 2006;42:528-36.

Kwak et al., New Insights on the Role of Multivalent Ions I Water-Carbonate Rock Interactions. Saudi Journal of Technology. 2014:25-38. Last accessed on Dec. 8, 2016 at <http://www.saudiaramco.com/content/dam/Publications/Journal-of-Technology/Summer2014/New_Insights.pdf>.

Li, Experimental Analysis of Produced Water Desalination by a Humidification-Dehumidification Process. 2009. 62 pages.

Li, Mineral precipitation and deposition in cooling systems using impaired waters: mechanisms, kinetics, and inhibition. Dissertation defended Jul. 27, 2010. 224 pages.

McGinnis et al., Pilot demonstration of the NH3/CO2 forward osmosis desalination process on high salinity brines. Desalination. Mar. 2013;312:67-74. Supporting information included.

Moghadasi et al., Scale deposits in porous media and their removal by EDTA injection. ECI Symposium Series. 2007. vol. RP5. Article 10. p. 57-70.

Narayan et al., The potential of solar-driven humidification-dehumidification desalination for small-scale decentralized water production. Renewable and Sustainable Energy Reviews. 2010;14:1187-1201.

Narayan et al., Thermal design of the humidification desalination system: an experimental investigation. International Journal of Heat and Mass Transfer. 2013;58:1-9.

Narayan et al., Thermodynamic balancing of the humidification dehumidification desalination system by mass extraction and injection. International Journal of Heat and Mass Transfer. 2013;57:756-70.

Sahin, A Mathematical Model for Explanation of Ion Exchange of the Boric Acid Adsorption. Jour. Chem. Soc. Pak. 1998;20(1):12-8.

Sinex, EDTA—A molecule with a complex story. University of Bristol, School of Chemistry. <www.chm.bris.ac.uk/motm/edta/edtah.htm> (accessed Jan. 8, 2013). Aug. 1, 2007.

Thiel et al., Hybridization of Humidification-Dehumidification and Pressure Retarded Osmosis for Brine Concentration Applications. The International Desalination Association World Congress on Desalination and Water Reuse. San Diego, California. Aug.-Sep. 8 pages.

Tiraferri et al., Relating performance of thin-film composite forward osmosis membranes to support layer formation and structure. Journal of Membrane Science. 2011;367:340-52. Epub Nov. 12, 2010.

Zamen et al., Improvement of solar humidification-dehumidification desalination using multi-stage process. 6 pages. Accessed Jun. 6, 2014.

McCutcheon et al., Influence of concentrative and dilutive internal concentration polarization on flux behavior in forward osmosis. Journal of Membrane Science. Nov. 2006;284(1-2):237-47. Epub Aug. 11, 2006.

\* cited by examiner

SELECTIVE RETENTION OF MULTIVALENT IONS

RELATED APPLICATIONS

This application is a U.S. National Stage patent application based on International Application PCT/US2016/046709, filed Aug. 12, 2016, which claims priority under 35 U.S.C. § 119(e) to U.S. Provisional Patent Application Ser. No. 62/205,633, filed Aug. 14, 2015 and entitled "Selective Retention of Multivalent Ions" each of which is incorporated herein by reference in its entirety for all purposes.

TECHNICAL FIELD

Systems and methods in which solubilized multivalent ions are selectively retained in an aqueous stream are generally described.

SUMMARY

Selective retention of solubilized multivalent ions in aqueous streams is generally described. Certain embodiments are related to inventive arrangements of separation membranes, which can lead to enhancements in efficiency. For example, in some embodiments, one or more osmotic membrane separators can be used to at least partially separate water from solubilized monovalent ions and/or solubilized multivalent ions. The subject matter of the present invention involves, in some cases, interrelated products, alternative solutions to a particular problem, and/or a plurality of different uses of one or more systems and/or articles.

According to certain embodiments, a method is provided. The method comprises, in some embodiments, transporting an aqueous feed stream containing solubilized monovalent ions and solubilized multivalent ions between an ion-selective membrane and an osmotic membrane, such that: the aqueous feed stream is transported across a first side of the ion-selective membrane and across a first side of the osmotic membrane; and at least a portion of the solubilized monovalent ions and the water from the aqueous feed stream is transported from the first side of the ion-selective membrane, through the ion-selective membrane, to a second side of the ion-selective membrane; and transporting at least a portion of the water from the second side of the ion-selective membrane to a second side of the osmotic membrane, such that at least a portion of the water from the second side of the osmotic membrane is transported from the second side of the osmotic membrane, through the osmotic membrane, to the first side of the osmotic membrane.

In some embodiments, the method comprises transporting an aqueous feed stream containing solubilized monovalent ions and solubilized multivalent ions into an ion-selective separator to produce a monovalent-ion-enriched stream containing at least about 75% of the solubilized monovalent ions from the aqueous feed stream and a multivalent-ion-enriched stream containing at least about 75% of the solubilized multivalent ions from the aqueous feed stream; transporting at least a portion of the monovalent-ion-enriched stream across a first side of an osmotic membrane and at least a portion of the multivalent-ion-enriched stream across a second side of the osmotic membrane such that at least a portion of the water in the monovalent-ion-enriched stream is transported through the osmotic membrane and into the multivalent-ion-enriched stream.

The method comprises, in some embodiments, exposing an ion-selective membrane to an aqueous feed stream containing solubilized monovalent ions and solubilized multivalent ions to produce a monovalent-ion-enriched stream containing water and at least about 75% of the solubilized monovalent ions from the aqueous feed stream; transporting at least a portion of the water from the monovalent-ion-enriched stream from a first side of an osmotic membrane, through the osmotic membrane, and to a second side of the osmotic membrane; and combining the portion of the water transported through the osmotic membrane with a stream on the second side of the osmotic membrane, wherein the stream on the second side of the osmotic membrane comprises at least a portion of the solubilized multivalent ions from the aqueous feed stream.

In some embodiments, a system is provided. The system comprises, in certain embodiments, a housing; an ion-selective membrane positioned at least partially within the housing, the ion-selective membrane having a first side and a second side; an osmotic membrane positioned at least partially within the housing, the osmotic membrane having a first side facing the first side of the ion-selective membrane, and a second side, wherein at least a portion of the first side of the ion-selective membrane and at least a portion of the first side of the osmotic membrane define a flow pathway between the ion-selective membrane and the osmotic membrane; and a conduit fluidically connecting the second side of the ion-selective membrane to the second side of the osmotic membrane.

In some embodiments, the system comprises an ion-selective separator configured to at least partially separate solubilized monovalent ions from solubilized multivalent ions, the ion-selective separator comprising an inlet, a first outlet configured to output a monovalent-ion-enriched stream, and a second outlet configured to output a multivalent-ion-enriched stream; and an osmotic membrane separator fluidically connected to the ion-selective separator, such that the first outlet of the ion-selective separator is fluidically connected to a first side of an osmotic membrane of the osmotic membrane separator, and the second outlet of the ion-selective separator is fluidically connected to a second side of the osmotic membrane of the osmotic membrane separator.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Disclosed herein are systems and methods in which multivalent ions are selectively retained in an aqueous stream. According to certain embodiments, multiple separations may be used to process an aqueous feed stream containing solubilized monovalent ions and solubilized multivalent ions to produce a stream enriched in the solubilized multivalent ions. The separations may be arranged, according to certain embodiments, to enhance the overall separation process such that the product stream contains—relative to the initial aqueous feed stream—a high amount of solubilized multivalent ions, a high amount of water from the aqueous feed stream, and/or a high ratio of solubilized multivalent ions to solubilized monovalent ions.

Some embodiments are related to inventive arrangements of separation membranes. For example, according to certain embodiments, multiple separation membranes are arranged in a single housing. The membranes may be spaced apart from each other such that an aqueous stream comprising both solubilized monovalent ions and solubilized multivalent ions is transported between the membranes. According to certain embodiments, the membranes may be arranged, and the flow rates of certain streams may be configured, such that water and solubilized monovalent ions are transported out of the aqueous feed stream through the first membrane (while the transport of solubilized multivalent ions is restricted) and such that water is transported back into the aqueous feed stream through the second membrane (while the transport of solubilized monovalent ions back into the aqueous feed stream is restricted). Such arrangements can, in some instances, increase the efficiency with which the multivalent-ion enriched stream is produced. For example, in some cases, such arrangements can allow for the production of aqueous streams enriched in solubilized multivalent ions using relatively compact equipment and/or using relatively low amounts of energy.

Certain embodiments are related to inventive systems and methods for performing multiple membrane-based separation steps in an efficient manner. In some such embodiments, an ion-selective membrane can be used to produce a monovalent-ion-enriched stream (containing water and solubilized monovalent ions) from an aqueous feed stream containing solubilized monovalent ions and solubilized multivalent ions. In some such embodiments, at least a portion of the water from the monovalent-ion-enriched stream can be transported through an osmotic membrane to a stream on the permeate side of the osmotic membrane. The stream on the permeate side of the osmotic membrane can contain at least a portion of the multivalent ions from the aqueous feed stream. By performing the ion-selective separation and osmotic separation steps in this manner, according to certain embodiments, the amount of energy needed to achieve a given level of multivalent ion purity can be reduced.

Figure 1A:
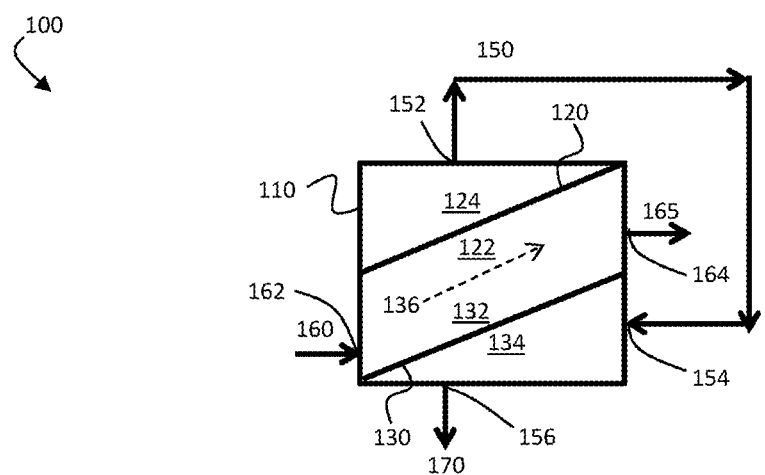
FIG. 1A is, according to certain embodiments, a schematic illustration of a system for producing a multivalention-enriched product stream comprising an ion-selective membrane and an osmotic membrane.

Certain embodiments are related to systems for producing aqueous streams that are enriched in solubilized multivalent ions from an aqueous feed stream comprising a mixture of the solubilized multivalent ions and solubilized monovalent ions. Some embodiments are related to systems in which an ion-selective membrane and an osmotic membrane are spatially arranged and integrated with a housing to efficiently produce a multivalent-ion enriched stream from an aqueous feed stream comprising a combination of solubilized monovalent ions and solubilized multivalent ions. According to some embodiments, the system comprises a housing, an ion-selective membrane positioned at least partially within the housing, and an osmotic membrane positioned at least partially within the housing. One exemplary system is illustrated in FIG. 1A, in which system 100 comprises housing 110, ion-selective membrane 120 positioned within housing 110, and osmotic membrane 130 positioned within housing 110. While housing 110 is shown as being enclosed (with the exception of the inlets and outlets), an enclosed housing is not necessarily required, and in certain embodiments, the housing can have one or more openings. For example, in some cases, it may not be necessary to pressurize a particular compartment within the housing, in which case, such compartment may be open to the surrounding environment.

According to certain embodiments, the ion-selective membrane and the osmotic membrane can be positioned relative to each other such that they spatially define a flow pathway between them. For example, the ion-selective membrane can have a first side, and the osmotic membrane can have a first side facing the first side of the ion-selective membrane. Referring to FIG. 1A, for example, ion-selective membrane 120 has first side 122 and second side 124, and osmotic membrane 130 has first side 132 and second side 134. In addition, in FIG. 1A, first side 132 of osmotic membrane 130 is facing first side 122 of ion-selective membrane 120. In FIG. 1A, ion-selective membrane 120 and osmotic membrane 130 are positioned relative to each other such that they define flow pathway (indicated by dashed arrow 136) between them.

While ion-selective membrane 120 and osmotic membrane 130 are illustrated as being parallel and planar in FIG. 1A, the membranes do not necessarily have to be parallel or planar in all embodiments. In certain embodiments, the ion-selective membrane and the osmotic membrane can be rolled together (while the spacing between them is maintained), for example, to form a "jelly-roll" arrangement. In certain embodiments, the ion-selective membrane and the osmotic membrane can be planar (or substantially planar) but not perfectly parallel. For example, the planar or substantially planar membranes can be parallel to within 10°, within 5°, within 2°, or within 1°, in certain embodiments. Non-parallel membranes could also be employed.

Suitable separation between the ion-selective membrane and the osmotic membrane (which can allow for a suitable flow pathway to be formed between the two) can be maintained via a variety of suitable methods. For example, in some embodiments, spacers can be arranged between the membranes to prevent facial contact between the first side of the ion-selective membrane and the first side of the osmotic membrane, at least in a sufficient number of regions to allow for flow of fluid between the first side of the ion-selective membrane and the first side of the osmotic membrane.

According to certain embodiments, the facial surface of the first side of the ion-selective membrane and the facial surface of the first side of the osmotic membrane can be spaced relatively close together. For example, in some embodiments, the shortest distance between the facial surface the first side of the ion-selective membrane and the facial surface of the first side of the osmotic membrane is less than about 1 cm, less than about 5 mm, less than about 1.5 mm, or less than about 1 mm. In some embodiments, the average distance between the facial surface the first side of the ion-selective membrane and the facial surface of the first side of the osmotic membrane is less than about 1 cm, less than about 5 mm, less than about 1.5 mm, or less than about 1 mm.

A variety of types of ion-selective membranes may be used, according to certain embodiments. Generally, the ion-selective membrane is chosen such that it may transmit solubilized monovalent ions while inhibiting (or completely preventing) the transmission of solubilized multivalent ions. For example, in FIG. 1A, ion-selective membrane 120 may be configured to transmit solubilized monovalent ions from first side 122 to second side 124 while inhibiting (or completely preventing) the transmission of solubilized multivalent ions from first side 122 to second side 124, as described in more detail below. Such selective separation may be achieved, for example, by using a membrane having appropriately sized pores (e.g., pores with sizes that allow for transmission of solubilized monovalent ions and the retention of solubilized multivalent ions). Achieving appropriate separation may also involve, according to certain embodiments, establishing appropriate stream flow rate(s) and/or applying an appropriate hydraulic pressure to the retentate side of the membrane, as discussed in more detail below. In some embodiments, the ion-selective membrane is made of a bulk material (e.g., a polymer such as polyethylene terephthalate, polysulfone, polyethersulfone; a metal such as aluminum; oxides such as alumina; and composites of these) through which pores extend. According to certain embodiments, the ion-selective membrane has a molecular weight cut off of at least about 200 Da, such as from about 200 Da to about 1000 Da, from about 200 Da to about 800 Da, or from about 200 Da to about 400 Da. The molecular weight cutoff of a membrane can be measured, for example, by determining the lowest molecular weight of polyethylene glycol (PEG) or polyethylene oxide (PEO) at which rejection of the PEG or PEO with that molecular weight is greater than 90%, when present at a feed concentration of 200 ppm, a feed pressure of 15 psi, and a feed temperature of 20° C. The ion-selective membrane may have, according to certain embodiments, an average pore size of at least about 1 nanometer, such as from about 1 nanometer to about 10 nanometers. While the ion-selective membranes are generally illustrated as being planar in the figures, it should be understood that the membranes need not necessarily be planar. For example, in some embodiments, the ion-selective membrane(s) can be a spiral-wound membrane or have any other suitable form factor. In some embodiments, the ion-selective membrane comprises a nanofiltration membrane. Examples of commercially available membranes that can be used as an ion-selective membrane include, according to certain embodiments, Dow Filmtec NF-90, GE Osmonics DK series, and Synder NFW membranes.

A variety of types of osmotic membranes may also be used, according to certain embodiments. Those of ordinary skill in the art are familiar with osmotic membranes. Generally, osmotic membranes selectively transmit water while inhibiting (or completely preventing) the transmission of ions (including both solubilized monovalent ions and solubilized multivalent ions) through the membrane. For example, in FIG. 1A, osmotic membrane 130 may be configured to transmit water from second side 134 to first side 132 while inhibiting (or completely preventing) the transmission of solubilized monovalent ions from second side 134 to first side 132, as described in more detail below. Such selective separation may be achieved, for example, by selecting a membrane having appropriately sized pores. In some embodiments, the osmotic membrane is made of a bulk material through which pores extend. The osmotic membrane may have, according to certain embodiments, an average pore size of less than about 1 nanometer. According to certain embodiments, the osmotic membrane has a molecular weight cut off about 100 Da or less. Generally, the sizes of the pores within the osmotic membrane that allow for selective retention of ions will be smaller than the pores within the ion-selective membrane that allow for the transmission of solubilized monovalent ions and the retention of solubilized multivalent ions. The bulk material of the osmotic membrane can comprise, for example, a metal, a ceramic, a polymer (e.g., polyamides, polyethylenes, polyesters, poly(tetrafluoroethylene), polysulfones, polyethersulfones, polycarbonates, polypropylenes, poly(acrylates)), and/or composites or other combinations of these. While the osmotic membranes are generally illustrated as being planar in the figures, it should be understood that the osmotic membranes need not necessarily be planar. For example, in some embodiments, the osmotic membrane(s) can be a spiral-wound membrane or have any other suitable form factor. Examples of commercially available osmotic membranes that can be used in association with certain of the embodiments described herein include, but are not limited to, those commercially available from Dow Water and Process Solutions (e.g., FilmTec™ membranes), Hydranautics, GE Osmonics, and Toray Membrane, among others known to those of ordinary skill in the art.

According to certain embodiments, the system comprises a conduit fluidically connecting the second side of the ion-selective membrane to the second side of the osmotic membrane. For example, in FIG. 1A, system 100 comprises a conduit (which can contain stream 150, described further below) fluidically connecting second side 124 of ion-selective membrane 120 to second side 134 of osmotic membrane 130 (via outlet 152 and inlet 154). In certain embodiments, the conduit fluidically connecting the second side of the ion-selective membrane to the second side of the osmotic membrane can establish a direct fluidic connection between the second side of the ion-selective membrane and the second side of the osmotic membrane. For example, in FIG. 1A, stream 150 is illustrated as establishing a direct fluidic connection between outlet 152 and inlet 154. The direct fluidic connection between the second side of the ion-selective membrane and the second side of the osmotic membrane is optional, and in other embodiments, an indirect fluidic connection can be established between the second side of the ion-selective membrane and the second side of the osmotic membrane.

In some embodiments, the ion-selective membrane can be configured such that a stream (e.g., the aqueous feed stream) can be transported across the facial area of the first side of the ion-selective membrane. Such transport may be useful, for example, when the ion-selective membrane is operated as a cross-flow separator. The ion-selective membrane could also be operated, for example, as a co-flow or a counter-flow separator. For example, in some embodiments, another stream (e.g., a portion of aqueous feed stream 160 and/or another stream) could be transported across second side 124 of ion-selective membrane 120, either in a co-flow or a counter-flow configuration relative to stream 136. Transportation of a stream across the facial area of the first side of the ion-selective membrane can be achieved, for example, by arranging an inlet and an outlet such that they span at least a portion of the facial area of the first side of the ion-selective membrane. In some such embodiments, when a fluid is transported from the inlet to the outlet, it is transported across at least a portion of the facial area of the first side of the ion-selective membrane. For example, in FIG. 1A, system 100 comprises inlet 162 and outlet 164, and when aqueous feed stream 160 is transported from inlet 162 to outlet 164, the fluid is transported across the facial area of first side 122 of ion-selective membrane 120.

Unless explicitly indicated otherwise, streams that are transported "across" a side of a membrane are transported along the facial area of the membrane, while streams that are transported "through" a membrane are transported through the thickness of the membrane. For example, referring to FIG. 1A, aqueous feed stream 160 is transported across first side 122 of ion-selective membrane 120 when aqueous feed stream is transported from inlet 162 to outlet 164. In the other hand, a portion of the water within the aqueous feed stream is transported through ion selective membrane 120 when it is transported from first side 122 of ion-selective membrane 120 to second side 124 of ion-selective membrane 120.

According to certain embodiments, the osmotic membrane can be configured such that a stream (e.g., the aqueous feed stream) can be transported across the facial area of the first side of the osmotic membrane. Such transport may be useful, for example, when the osmotic membrane is operated as a co-flow or a counter-flow osmotic membrane separator. Transportation of a stream across the facial area of the first side of the osmotic membrane can be achieved, for example, by arranging an inlet and an outlet such that they span at least a portion of the facial area of the first side of the osmotic membrane. In some such embodiments, when a fluid is transported from the inlet to the outlet, it is transported across at least a portion of the facial area of the first side of the osmotic membrane. For example, in FIG. 1A, system 100 comprises inlet 162 and outlet 164, and when aqueous feed stream 160 is transported from inlet 162 to outlet 164, the fluid is transported across the facial area of first side 132 of osmotic membrane 130.

In some embodiments, the osmotic membrane can be configured such that a stream can be transported across the facial area of the second side of the osmotic membrane. Such transport may be useful, for example, when the osmotic membrane is operated as a co-flow or a counter-flow osmotic membrane separator. Transportation of a stream across the facial area of the second side of the osmotic membrane can be achieved, for example, by arranging an inlet and an outlet such that they span at least a portion of the facial area of the second side of the osmotic membrane. In some such embodiments, when a fluid is transported from the inlet to the outlet, it is transported across at least a portion of the facial area of the second side of the osmotic membrane. For example, in FIG. 1A, system 100 comprises inlet 154 and outlet 156, and when fluid is transported from inlet 154 to outlet 156, the fluid is transported across the facial area of second side 134 of osmotic membrane 130.

Certain embodiments are related to methods of operating a system comprising an ion-selective membrane and an osmotic membrane to produce an aqueous stream enriched in solubilized multivalent ions from an aqueous feed stream comprising a mixture of the solubilized multivalent ions and solubilized monovalent ions.

In certain embodiments, the method comprises transporting an aqueous feed stream containing solubilized monovalent ions and solubilized multivalent ions between the ion-selective membrane and the osmotic membrane. For example, referring to FIG. 1A, certain embodiments comprise transporting aqueous feed stream 160, which can contain solubilized monovalent ions and solubilized multivalent ions, between ion-selective membrane 120 and osmotic membrane 130. According to certain embodiments, the aqueous feed stream is transported across a first side of the ion-selective membrane and across a first side of the osmotic membrane. For example, in FIG. 1A, aqueous feed stream 160 is transported across first side 122 of ion-selective membrane 120 and across first side 132 of osmotic membrane 130, from inlet 162 to outlet 164. The aqueous feed stream can simultaneously contact the first side of the ion-selective membrane and the osmotic membrane, according to certain embodiments, as it is transported between the ion-selective membrane and the osmotic membrane. For example, in FIG. 1A, aqueous feed stream 160 simultaneously contacts both first side 122 of ion-selective membrane 120 and first side 132 of osmotic membrane 130 as it is transported along flow pathway 136 between ion-selective membrane 120 and osmotic membrane 130.

The ion-selective membrane can be configured, according to certain embodiments, such that when the first side of the ion-selective membrane is exposed to the aqueous solution containing both solubilized monovalent ions and solubilized multivalent ions (and, optionally, a hydraulic pressure is applied to the solution on the first side), at least a portion (e.g., at least about 75%, at least about 85%, at least about 90%, at least about 95%, or at least about 99%, on a molar basis) of the solubilized monovalent ions from the aqueous feed stream are transported through the ion-selective membrane from the first side to a second side. In some such embodiments, at least a portion (e.g., at least about 75%, at least about 85%, at least about 90%, at least about 95%, or at least about 99%, on a molar basis) of the solubilized multivalent ions from the aqueous feed stream are prevented from being transported through the ion-selective membrane, and remain on the first side of the ion-selective membrane. Operation in this manner can result in the creation of a multivalent-ion-enriched stream (corresponding to the retentate of the ion-selective membrane) and a monovalent-ion-enriched stream (corresponding to the permeate of the ion-selective membrane).

Certain embodiments comprise transporting the aqueous feed stream containing the solubilized monovalent ions and the solubilized multivalent ions across the ion-selective membrane to at least partially separate the solubilized monovalent ions and the solubilized multivalent ions and to produce a monovalent-ion-enriched stream and a multivalent-ion-enriched stream. According to certain embodiments, operation of the system comprises transporting at least a portion of the solubilized monovalent ions and the water from the aqueous feed stream from the first side of the ion-selective membrane, through the ion-selective membrane, to a second side of the ion-selective membrane. Solubilized multivalent ions, on the other hand, can be selectively retained by the ion-selective membrane.

For example, referring to FIG. 1A, in some embodiments, aqueous feed stream 160 (containing solubilized monovalent ions and solubilized multivalent ions) is transported across ion-selective membrane 120 (along flow pathway 136) to at least partially separate the solubilized monovalent ions and the solubilized multivalent ions to produce monovalent-ion-enriched stream 150 and multivalent-ion-enriched product stream 165. Certain embodiments comprise exposing first side 122 of ion-selective membrane 120 to aqueous feed stream 160 (and, optionally, applying a hydraulic pressure to first side 122 of ion-selective membrane 120) such that at least a portion (e.g., at least about 75%, at least about 85%, at least about 90%, at least about 95%, or at least about 99%, on a molar basis) of the solubilized monovalent ions from aqueous feed stream 160 are transported from first side 122 of ion-selective membrane 120, through ion-selective membrane 120, to second side 124 of ion-selective membrane 120. In some such embodiments, at least a portion (e.g., at least about 75%, at least about 85%, at least about 90%, at least about 95%, or at least about 99%, on a molar basis) of the solubilized multivalent ions from aqueous feed stream 160 are prevented from being transported through ion-selective membrane 120, and remain on first side 122 of ion-selective membrane 120. Thus, according to certain such embodiments, as the aqueous feed stream is transported across the first side of the ion-selective membrane, the aqueous feed stream can become more concentrated in solubilized multivalent ions, relative to the concentration of solubilized multivalent ions present within the aqueous feed stream as it enters the system. In addition, in some such embodiments, because solubilized monovalent ions are being transported through the ion-selective membrane at a faster rate than are solubilized multivalent ions, the ratio of solubilized multivalent ions to solubilized monovalent ions within the aqueous feed stream may also increase as the aqueous feed stream is transported along the flow pathway between the ion-selective membrane and the osmotic membrane. Referring to FIG. 1A, in some embodiments, as aqueous feed stream 160 is transported across first side 122 of ion-selective membrane 120, aqueous feed stream 160 can become more concentrated in solubilized multivalent ions, relative to the concentration of solubilized multivalent ions present within the aqueous feed stream at inlet 162. In some such embodiments, because solubilized monovalent ions are being transported through ion-selective membrane 120 at a faster rate than are solubilized multivalent ions, the ratio of solubilized multivalent ions to solubilized monovalent ions within aqueous feed stream 160 may also increase as the aqueous feed stream is transported along flow pathway 136 between ion-selective membrane 120 and osmotic membrane 130. Operation in this manner can result in the creation of multivalent-ion-enriched product stream 165 (corresponding to the retentate of ion-selective membrane 120) and monovalent-ion-enriched stream 150 (corresponding to the permeate of ion-selective membrane 120).

As noted above, certain embodiments comprise using an osmotic membrane in combination with the ion-selective membrane. In some such embodiments, the osmotic membrane can be used to separate at least a portion of the solubilized monovalent ions and the water within the monovalent-ion-enriched stream. According to certain embodiments, at least a portion of the water from the monovalent-ion-enriched stream can be added back to the aqueous stream being transported between the ion-selective membrane and the osmotic membrane, which can produce a monovalent-ion-enriched stream with a relatively high amount of water, relative to the amount of water that would be present in the monovalent-ion-enriched stream were the osmotic water addition not included.

Figure 1B:
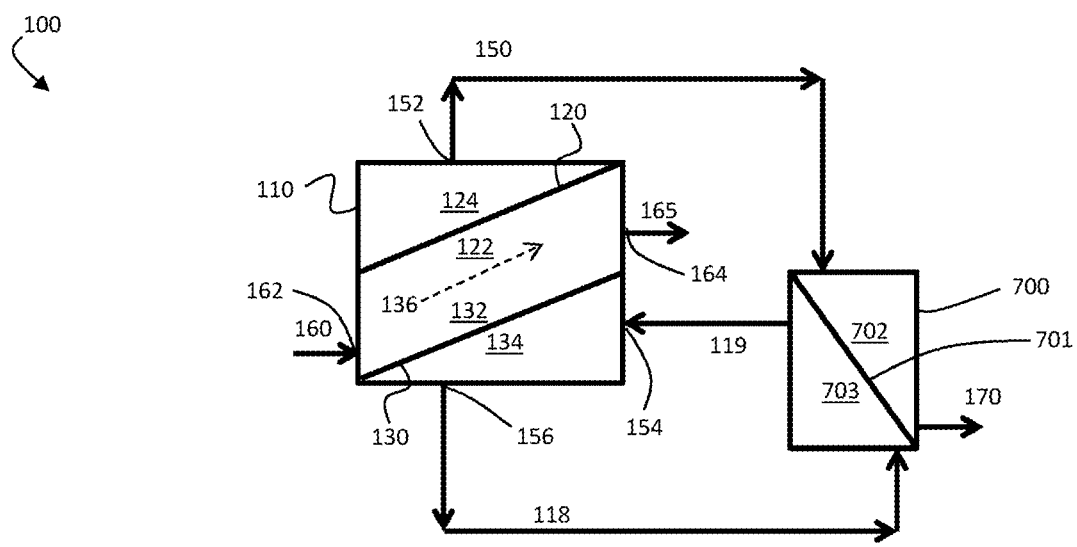
FIG. 1B is, according to certain embodiments, a schematic illustration of a system for producing a multivalent-ion-enriched product stream comprising an ion-selective membrane and an osmotic membrane, and in which an intermediate osmotic separator is used.

According to certain embodiments, water can be added back to the aqueous stream by transporting at least a portion of the monovalent-ion-enriched stream across the second side of the osmotic membrane. For example, certain embodiments comprise transporting at least a portion (e.g., at least about 10 wt %, at least about 25 wt %, at least about 50 wt %, at least about 75 wt %, at least about 85 wt %, at least about 90 wt %, at least about 95 wt %, or at least about 99 wt %) of the water from the second side of the ion-selective membrane to a second side of the osmotic membrane. Some such embodiments comprise transporting at least a portion (e.g., at least about 10%, at least about 25%, at least about 50%, at least about 75%, at least about 85%, at least about 90%, at least about 95%, or at least about 99%, on a molar basis) of the solubilized monovalent ions from the second side of the ion-selective membrane to a second side of the osmotic membrane (e.g., along with the portion of the water that is transported to the second side of the osmotic membrane). Referring to FIG. 1A, for example, some embodiments comprise transporting at least a portion (e.g., at least about 10 wt %, at least about 25 wt %, at least about 50 wt %, at least about 75 wt %, at least about 85 wt %, at least about 90 wt %, at least about 95 wt %, or at least about 99 wt %) of the water from second side 124 of ion-selective membrane 120 to second side 134 of osmotic membrane 130 via monovalent-ion-enriched stream 150. Some such embodiments also comprise transporting at least a portion (e.g., at least about 10%, at least about 25%, at least about 50%, at least about 75%, at least about 85%, at least about 90%, at least about 95%, or at least about 99%, on a molar basis) of the solubilized monovalent ions from second side 124 of ion-selective membrane 120 to second side 134 of osmotic membrane 130 via monovalent-ion-enriched stream 150. According to other embodiments, the solubilized monovalent ions may be removed from the portion of the monovalent-ion-enriched stream that is transported to the second side of the osmotic membrane. For example, as described in more detail below, in some embodiments, the monovalent-ion-enriched stream may be treated using one or more intermediate osmosis steps, and substantially only water from the monovalent-ion-enriched stream (e.g., stream 150) may be transported to the second side of the osmotic membrane. An example of one such arrangement is illustrated in FIG. 1B. In FIG. 1B, ion-enriched stream 150 can be transported to first side 702 of osmotic membrane 701 of intermediate osmotic separator 700. In some such embodiments, the output of second side 134 of osmotic membrane 130, illustrated as stream 118 in FIG. 1B, can be used as a draw stream and transported to second side 703 of osmotic membrane 701. In some embodiments, water can be transferred from stream 150 from first side 702 of osmotic membrane 701 to second side 703 of osmotic membrane 701 and combined with stream 118 to produce product stream 119. In some such embodiments, the water can be transferred from stream 150 to stream 118 by applying a hydraulic pressure to side 702 of osmotic membrane 701. In some such embodiments, product stream 119 can be transported to second side 134 of osmotic membrane 130. Water may be transferred from stream 119, across osmotic membrane 130 (from side 134 to side 132) according to certain such embodiments. In some such embodiments, a hydraulic pressure can be applied to side 134 of osmotic membrane 130 to provide at least a portion of the driving force for transferring water from side 134 to side 132.

In certain embodiments, the housing comprises an outlet on the second side of the ion-selective membrane and an inlet on the second side of the osmotic membrane. A fluidic connection can be established between the outlet on the second side of the ion-selective membrane and the inlet on the second side of the osmotic membrane, for example, via a conduit. Referring to FIG. 1A, for example, monovalent-ion-enriched aqueous solution can be transported out of outlet 152, through a conduit (along the pathway for stream 150), and into inlet 154. While a direct fluidic connection is shown between outlet 152 and inlet 154 in FIG. 1A, direct fluidic connections are not necessarily required in all embodiments. Accordingly, in other embodiments, outlet 152 and inlet 154 can be indirectly fluidically connected. For example in some cases, monovalent-ion-enriched outlet stream 150 may be transported through one or more intermediate osmotic membrane separators before at least a portion of the water within monovalent-ion-enriched outlet stream 150 is transported to second side 134 of osmotic membrane 130.

According to certain embodiments, water can be selectively transported through the osmotic membrane (from the second side of the osmotic membrane to the first side of the osmotic membrane), such that the aqueous stream being transported between the ion-selective membrane and the osmotic membrane is diluted while maintaining a suitable ratio of solubilized multivalent ions to solubilized monovalent ions. In some embodiments, at least a portion (e.g., at least about 10 wt %, at least about 25 wt %, at least about 50 wt %, at least about 75 wt %, at least about 85 wt %, at least about 90 wt %, at least about 95 wt %, or at least about 99 wt %, or between about 10 wt % and about 99 wt %, or between about 10 wt % and about 90 wt %) of the water from the second side of the osmotic membrane is transported from the second side of the osmotic membrane, through the osmotic membrane, to the first side of the osmotic membrane. In FIG. 1A, for example, at least a portion of the water within monovalent-ion-enriched stream 150 is transported from second side 134 of osmotic membrane 130 to first side 132 of osmotic membrane 130. In some such embodiments, a relatively large percentage (e.g., at least about 75%, at least about 85%, at least about 90%, at least about 95%, or at least about 99%, on a molar basis) of the solubilized monovalent ions within the monovalent-ion-enriched stream are transported to and prevented from being transported through the osmotic membrane. In FIG. 1A, for example, at least a portion of the monovalent ions within monovalent-ion-enriched stream 150 is prevented from being transported from second side 134 of osmotic membrane 130 to first side 132 of osmotic membrane 130. In some embodiments, the ratio to the number of water molecules to the number of ions transported through the osmotic membrane can be at least about 3:1, at least about 5:1, at least about 10:1, at least about 25:1, or at least about 50:1 (and/or, up to about 100:1, up to about 1000:1, or greater).

Selective transport of water (relative to solubilized species such as solubilized monovalent and/or solubilized multivalent ions) through an osmotic membrane can be achieved via a transmembrane net driving force (i.e., a net driving force through the thickness of the membrane), according to certain embodiments. Generally, the transmembrane net driving force ($\Delta\chi$) is expressed as:

$$\Delta\chi = \Delta P - \Delta\Pi = (P_R - P_P) - (\Pi_R - \Pi_P) \quad [1]$$

wherein $P_R$ is the hydraulic pressure on the retentate side of the osmotic membrane, $P_P$ is the hydraulic pressure on the permeate side of the osmotic membrane, $\Pi_R$ is the osmotic pressure of the stream on the retentate side of the osmotic membrane, and $\Pi_P$ is the osmotic pressure of the stream on the permeate side of the osmotic membrane. $(P_R - P_P)$ can be referred to as the transmembrane hydraulic pressure gradient, and $(\Pi_R - \Pi_P)$ can be referred to as the transmembrane osmotic pressure gradient.

Those of ordinary skill in the art are familiar with the concept of osmotic pressure. The osmotic pressure of a particular liquid is an intrinsic property of the liquid. The osmotic pressure can be determined in a number of ways, with the most efficient method depending upon the type of liquid being analyzed. For certain solutions with relatively low molar concentrations of ions, osmotic pressure can be accurately measured using an osmometer. In other cases, the osmotic pressure can simply be determined by comparison with solutions with known osmotic pressures. For example, to determine the osmotic pressure of an uncharacterized solution, one could apply a known amount of the uncharacterized solution on one side of a non-porous, semi-permeable, osmotic membrane and iteratively apply different solutions with known osmotic pressures on the other side of the osmotic membrane until the differential pressure through the thickness of the membrane is zero.

The osmotic pressure ($\Pi$) of a solution containing n solubilized species may be estimated as:

$$\Pi = \Sigma_{j=1}^{n} i_j M_j RT \quad [2]$$

wherein $i_j$ is the van't Hoff factor of the $j^{th}$ solubilized species, $M_j$ is the molar concentration of the $j^{th}$ solubilized species in the solution, R is the ideal gas constant, and T is the absolute temperature of the solution. Equation 2 generally provides an accurate estimate of osmotic pressure for liquid with low concentrations of solubilized species (e.g., concentrations at or below between about 4 wt % and about 6 wt %). For many liquid comprising solubilized species, at species concentrations above around 4-6 wt %, the increase in osmotic pressure per increase in salt concentration is greater than linear (e.g., slightly exponential).

The osmotic membrane can be used to perform, according to certain embodiments, a reverse osmosis process. Reverse osmosis generally occurs when the osmotic pressure on the retentate side of the osmotic membrane is greater than the osmotic pressure on the permeate side of the osmotic membrane, and a hydraulic pressure is applied to the retentate side of the osmotic membrane such that the hydraulic pressure on the retentate side of the osmotic membrane is sufficiently greater than the hydraulic pressure on the permeate side of the osmotic membrane to cause water to be transported from the retentate side of the osmotic membrane to the permeate side of the osmotic membrane. Generally, such situations result when the transmembrane hydraulic pressure gradient ($P_R-P_P$) is greater than the transmembrane osmotic pressure gradient ($\Pi_R-\Pi_P$) such that water is transported from the first side of the osmotic membrane to the second side of the osmotic membrane (rather than having water transported from the second side of the osmotic membrane to the first side of the osmotic membrane, which would be energetically favored in the absence of the pressure applied to the first side of the osmotic membrane). Operating the osmotic membrane to perform reverse osmosis can comprise applying a hydraulic pressure to the stream on the second side of the osmotic membrane, according to certain embodiments. Referring to FIG. 1A, for example, osmotic membrane 130 can be used to perform reverse osmosis, for example, when the osmotic pressure on second side 134 of osmotic membrane 130 is higher than the osmotic pressure on first side 132, a hydraulic pressure is applied to second side 134 such that the hydraulic pressure on second side 134 is higher than the hydraulic pressure on first side 132, and the difference between the hydraulic pressure on second side 134 and the hydraulic pressure on first side 132 is greater than the difference between the osmotic pressure on second side 134 and the osmotic pressure on first side 132. In such cases, water can be transported from second side 134 of osmotic membrane 130 to first side 132 of osmotic membrane 130.

Arranging the system such that the monovalent-ion-enriched stream is positioned on one side of the osmotic membrane and the multivalent-ion-enriched stream is positioned on the other side of the osmotic membrane can, according to certain embodiments, enhance the efficiency with which water from the monovalent-ion-enriched stream is transported into the multivalent-ion-enriched stream via reverse osmosis, relative to the efficiency that could be achieved were water removed from the monovalent-ion-enriched stream in a standalone reverse osmosis process. In particular, according to certain embodiments, the presence of the multivalent ions on the side of the osmotic membrane opposite the monovalent-ion-enriched stream can reduce the amount of hydraulic pressure that needs to be applied to the monovalent-ion-enriched stream to achieve a desired level of separation.

In certain embodiments, the osmotic membrane can be used to perform forward osmosis. Forward osmosis generally occurs when the osmotic pressure on the permeate side of the osmotic membrane is greater than the osmotic pressure on the retentate side of the osmotic membrane such that water is transported from the retentate side of the osmotic membrane to the permeate side of the osmotic membrane. In forward osmosis systems, water generally is transported from the retentate side of the osmotic membrane to the permeate side of the osmotic membrane as long as the hydraulic pressure difference between the permeate side of the osmotic membrane and the retentate side of the osmotic membrane is not sufficiently high to overcome the osmotic pressure difference between the retentate and permeate sides of the osmotic membrane. In this way, the permeate flow and the osmotic driving force are aligned in the same direction. In certain forward osmosis arrangements, the stream on the permeate side of the osmotic membrane can initiate the transport of water from the stream on the retentate side of the osmotic membrane and through the osmotic membrane from the retentate side to the permeate side. Referring to FIG. 1A, in some embodiments, osmotic membrane 130 can be used to perform forward osmosis, for example, when the osmotic pressure on first side 132 of osmotic membrane 130 is greater than the osmotic pressure on second side 134 of osmotic membrane 130, and when the hydraulic pressure gradient from first side 132 to second side 134 ($P_{132}-P_{134}$) is not large enough to overcome the difference in the osmotic pressure between second side 134 and first side 132. In such cases, water can be transported from second side 134 of osmotic membrane 130 to first side 132 of osmotic membrane 130. According to certain embodiments, arranging the system such that the monovalent-ion-enriched stream is positioned on one side of the osmotic membrane and the multivalent-ion-enriched stream is positioned on the other side of the osmotic membrane can allow one to perform the forward osmosis process. In particular, according to certain embodiments, the presence of the multivalent ions at a relatively high concentration on the side of the osmotic membrane opposite the monovalent-ion-enriched stream can provide at least a portion of the driving force for performing the forward osmosis process.

In some cases, hydraulic pressure may be applied to the retentate side of the osmotic membrane to enhance the forward osmosis process. For example, in some instances in which the stream on the retentate side of the osmotic membrane has a lower osmotic pressure than the stream on the permeate side of the osmotic membrane, a hydraulic pressure may be applied to the retentate side of the osmotic membrane such that the hydraulic pressure of the stream on the retentate side of the osmotic membrane is higher than the hydraulic pressure of the stream on the permeate side of the osmotic membrane. The applied pressure can increase the rate at which water is transported from the retentate side of the osmotic membrane to the permeate side of the osmotic membrane. Such arrangements are sometimes referred to herein as pressure-assisted forward osmosis (which is a particular type of forward osmosis). Referring to FIG. 1A, for example, osmotic membrane 130 can be used to perform pressure assisted forward osmosis, for example, by applying a hydraulic pressure to second side 134 of osmotic membrane 130 such that the hydraulic pressure of the stream on second side 134 of osmotic membrane 130 is higher than the hydraulic pressure of the stream on first side 132 of osmotic membrane 130. Of course, the use of an applied pressure to enhance forward osmosis is not generally required, and in some embodiments, forward osmosis is performed in the substantial absence of an applied pressure (e.g., such that the hydraulic pressure gradient through the osmotic membrane is less than or equal to about 0.1 bar).

Generally, whether the osmotic membrane is used to perform reverse osmosis or forward osmosis is determined by the osmotic pressures of the streams on either side of the osmotic membrane. For example, referring to FIG. 1A, according to certain embodiments, if the osmotic pressure on second side 134 of osmotic membrane 130 is higher than the osmotic pressure on first side 132 of osmotic membrane 130, and transport of water from second side 134 to first side 132 is desired, reverse osmosis will be performed. On the other hand, in some embodiments, the osmotic pressure on second side 134 of osmotic membrane 130 may be lower than the osmotic pressure on first side 132 of osmotic membrane 130, and transport of water from second side 134 to first side 132 may be desired, in which case, forward osmosis (pressure assisted or otherwise) may be performed.

According to certain embodiments, transporting at least a portion of the water in the monovalent-ion-enriched stream through the osmotic membrane and into the aqueous feed stream produces a multivalent-ion-enriched product stream. For example, referring to FIG. 1A, transporting at least a portion of the water in monovalent-ion-enriched stream 150 through osmotic membrane 130 (from second side 134 to first side 132) produces multivalent-ion-enriched product stream 165.

In some embodiments, a relatively large percentage of the solubilized multivalent ions from the aqueous feed stream is present in the multivalent-ion-enriched product stream. For example, in some embodiments, the multivalent-ion-enriched product stream contains at least about 75% (or at least about 85%, at least about 90%, at least about 95%, or at least about 99%, on a molar basis) of the solubilized multivalent ions from the aqueous feed stream. For example, in FIG. 1A, multivalent-ion-enriched product stream 165 can contain, according to certain embodiments, at least about 75% (or at least about 85%, at least about 90%, at least about 95%, or at least about 99%, on a molar basis) of the solubilized multivalent ions from aqueous feed stream 160.

Transporting at least a portion of the water in the monovalent-ion-enriched stream through the osmotic membrane and into the aqueous feed stream can also produce a monovalent-ion-enriched product stream, according to certain embodiments. For example, referring to FIG. 1A, transporting at least a portion of the water in monovalent-ion-enriched stream 150 through osmotic membrane 130 (from second side 134 to first side 132) and into aqueous feed stream 160 produces monovalent-ion-enriched product stream 170.

In some embodiments, the amount of solubilized monovalent ions within the monovalent-ion-enriched product stream is relatively high. In some embodiments, the monovalent-ion-enriched product stream contains at least about 75% (or at least about 85%, at least about 90%, at least about 95%, or at least about 99%, on a molar basis) of the solubilized monovalent ions from the aqueous feed stream. For example, in FIG. 1A, monovalent-ion-enriched product stream 170 can contain at least about 75% (or at least about 85%, at least about 90%, at least about 95%, or at least about 99%, on a molar basis) of the solubilized monovalent ions from aqueous feed stream 160.

According to certain embodiments, the multivalent-ion-enriched product stream can contain a relatively high amount of solubilized multivalent ions and a relatively low amount of solubilized monovalent ions. For example, in some embodiments, the ratio of solubilized multivalent ions within multivalent-ion-enriched product stream to solubilized monovalent ions within the multivalent-ion-enriched product stream is at least about 3:1, at least about 5:1, at least about 10:1, at least about 50:1, at least about 100:1, at least about 1000:1, at least about 10,000:1, or more. For example, in FIG. 1A, the ratio of solubilized multivalent ions within multivalent-ion-enriched product stream 165 to solubilized monovalent ions within multivalent-ion-enriched product stream 165 is at least about 3:1, at least about 5:1, at least about 10:1, at least about 50:1, at least about 100:1, at least about 1000:1, at least about 10,000:1, or more.

In some embodiments, the ratio of solubilized multivalent ions within multivalent-ion-enriched product stream to solubilized multivalent ions within the monovalent-ion-enriched product stream is at least about 3:1, at least about 5:1, at least about 10:1, at least about 50:1, at least about 100:1, at least about 1000:1, at least about 10,000:1, or more. For example, in FIG. 1A, the ratio of solubilized multivalent ions within multivalent-ion-enriched product stream 165 to solubilized multivalent ions within monovalent-ion-enriched product stream 170 is at least about 3:1, at least about 5:1, at least about 10:1, at least about 50:1, at least about 100:1, at least about 1000:1, at least about 10,000:1, or more.

According to certain embodiments, the monovalent-ion-enriched product stream can contain a relatively high amount of solubilized monovalent ions and a relatively low amount of solubilized multivalent ions. For example, in some embodiments, the ratio of solubilized monovalent ions within monovalent-ion-enriched product stream to solubilized multivalent ions within the monovalent-ion-enriched product stream is at least about 3:1, at least about 5:1, at least about 10:1, at least about 50:1, at least about 100:1, at least about 1000:1, at least about 10,000:1, or more. For example, in FIG. 1A, the ratio of solubilized monovalent ions within monovalent-ion-enriched product stream 170 to solubilized multivalent ions within monovalent-ion-enriched product stream 170 is at least about 3:1, at least about 5:1, at least about 10:1, at least about 50:1, at least about 100:1, at least about 1000:1, at least about 10,000:1, or more.

In some embodiments, the ratio of solubilized monovalent ions within the monovalent-ion-enriched product stream to solubilized monovalent ions within the multivalent-ion-enriched product stream is at least about 3:1, at least about 5:1, at least about 10:1, at least about 50:1, at least about 100:1, at least about 1000:1, at least about 10,000:1, or more. For example, in FIG. 1A, the ratio of solubilized monovalent ions within monovalent-ion-enriched product stream 170 to solubilized monovalent ions within multivalent-ion-enriched product stream 165 is at least about 3:1, at least about 5:1, at least about 10:1, at least about 50:1, at least about 100:1, at least about 1000:1, at least about 10,000:1, or more.

In some embodiments, a relatively large percentage of the water from the aqueous feed stream is present in the multivalent-ion-enriched product stream. For example, in certain embodiments, the multivalent-ion-enriched product stream contains at least about 75 wt % (or at least about 85 wt %, at least about 90 wt %, at least about 95 wt %, or at least about 99 wt %) of the water from the aqueous feed stream. For example, in FIG. 1A, multivalent-ion-enriched product stream 165 can contain, according to certain embodiments, at least about 75 wt % (or at least about 85 wt %, at least about 90 wt %, at least about 95 wt %, or at least about 99 wt %) of the water from aqueous feed stream 220.

Figure 2:
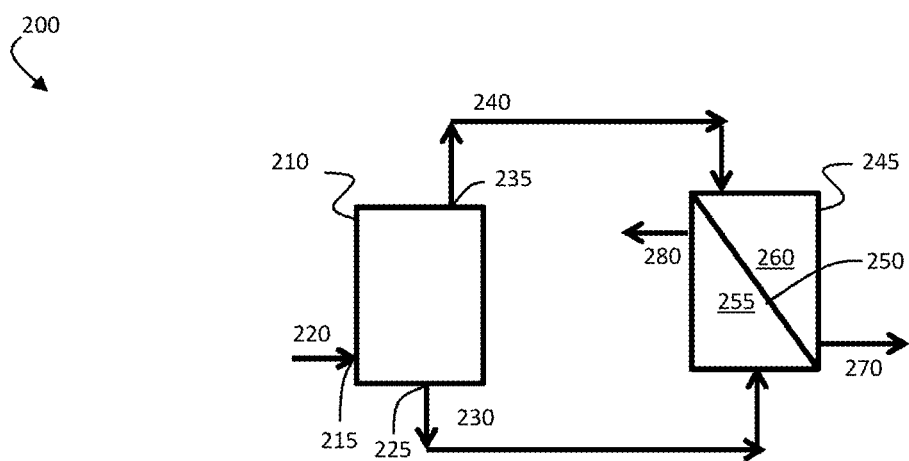
FIG. 2 is, according to some embodiments, a schematic illustration of a system comprising an ion-selective separator and an osmotic membrane separator.

While embodiments have been described in which ion-selective separation and subsequent osmotic separation are performed using an integrated device, the ion-selective separation and osmotic separation can performed using different separators, according to certain embodiments. FIG. 2 is a schematic illustration of one such exemplary system 200.

In certain embodiments, the system comprises an ion-selective separator configured to at least partially separate solubilized monovalent ions from solubilized multivalent ions. For example, referring to FIG. 2, in some embodiments, system 200 comprises ion-selective separator 210. The ion-selective separator comprises, according to certain embodiments, an inlet. Referring to FIG. 2, for example, ion-selective separator 210 comprises inlet 215. The inlet may be configured to receive an aqueous feed stream containing a mixture of solubilized monovalent ions and solubilized multivalent ions, as described in more detail below. For example, in FIG. 2, inlet 215 is configured to receive aqueous feed stream 220.

According to certain embodiments, the ion-selective separator comprises a first outlet configured to output a monovalent-ion-enriched stream and a second outlet configured to output a multivalent-ion-enriched stream. Referring to FIG. 2, for example, ion-selective separator 210 comprises first outlet 225 configured to output monovalent-ion-enriched stream 230 and second outlet 235 configured to output multivalent-ion-enriched stream 240.

According to certain embodiments, operation of the ion-selective separator comprises transporting an aqueous feed stream containing solubilized monovalent ions and solubilized multivalent ions into the ion-selective separator to at least partially separate the solubilized monovalent ions and the solubilized multivalent ions and to produce a monovalent-ion-enriched stream and a multivalent-ion-enriched stream. For example, referring to FIG. 2, in some embodiments, aqueous feed stream 220 containing solubilized monovalent ions and solubilized multivalent ions is transported into ion-selective separator 210 to at least partially separate the solubilized monovalent ions and the solubilized multivalent ions to produce monovalent-ion-enriched stream 230 and multivalent-ion-enriched stream 240. In some embodiments, the multivalent-ion-enriched stream contains at least about 75% (or at least about 85%, at least about 90%, at least about 95%, or at least about 99%, on a molar basis) of the multivalent ions from the aqueous feed stream. For example, in FIG. 2, multivalent-ion-enriched stream 240 can contain at least about 75% (or at least about 85%, at least about 90%, at least about 95%, or at least about 99%, on a molar basis) of the solubilized multivalent ions from aqueous feed stream 220. According to certain embodiments, the monovalent-ion-enriched stream contains at least about 75% (or at least about 85%, at least about 90%, at least about 95%, or at least about 99%, on a molar basis) of the solubilized monovalent ions from the aqueous feed stream. For example, in FIG. 2, monovalent-ion-enriched stream 230 can contain at least about 75% (or at least about 85%, at least about 90%, at least about 95%, or at least about 99%, on a molar basis) of the solubilized monovalent ions from aqueous feed stream 220.

The ion-selective separator can comprise any suitable separation apparatus capable of at least partially separating solubilized monovalent ions and solubilized multivalent ions.

According to certain embodiments, the ion-selective separator is an ion-selective membrane separator. The ion-selective membrane separator can comprise an ion-selective membrane. Examples of suitable ion-selective membranes include, for example, the ion-selective membranes described elsewhere herein with respect to FIG. 1A.

The ion-selective membrane can be configured, according to certain embodiments, such that when a first side of the membrane is exposed to an aqueous solution containing both solubilized monovalent ions and solubilized multivalent ions (and, optionally, a hydraulic pressure is applied to the solution on the first side), at least a portion (e.g., at least about 75%, at least about 85%, at least about 90%, at least about 95%, or at least about 99%, on a molar basis) of the solubilized monovalent ions from the aqueous feed stream are transported through the ion-selective membrane from the first side to a second side. In some such embodiments, at least a portion (e.g., at least about 75%, at least about 85%, at least about 90%, at least about 95%, or at least about 99%, on a molar basis) of the solubilized multivalent ions from the aqueous feed stream are prevented from being transported through the ion-selective membrane, and remain on the first side of the ion-selective membrane. Operation in this manner can result in the creation of a multivalent-ion-enriched stream (corresponding to the retentate of the ion-selective membrane separator) and a monovalent-ion-enriched stream (corresponding to the permeate of the ion-selective membrane separator).

Figure 3:
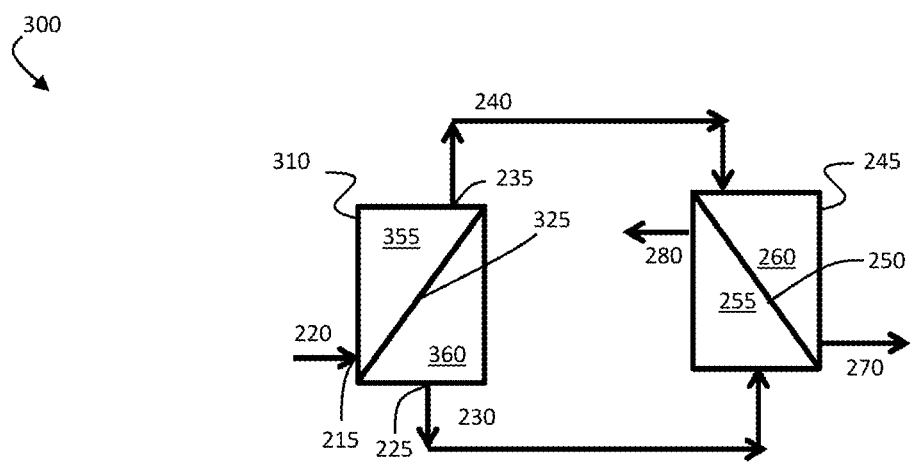
FIG. 3 is a schematic illustration of a system comprising an ion-selective membrane separator and an osmotic membrane separator, according to certain embodiments.

FIG. 3 is a schematic illustration of an exemplary system 300, in which the ion-selective separator is an ion-selective membrane separator. As shown in FIG. 3, ion-selective membrane separator 310 comprises ion-selective membrane 325, which comprises first side 355 and second side 360. Certain embodiments comprise transporting an aqueous feed stream containing solubilized monovalent ions and solubilized multivalent ions into the ion-selective membrane separator to at least partially separate the solubilized monovalent ions and the solubilized multivalent ions and to produce a monovalent-ion-enriched stream and a multivalent-ion-enriched stream. For example, referring to FIG. 3, in some embodiments, aqueous feed stream 220 containing solubilized monovalent ions and solubilized multivalent ions is transported into ion-selective membrane separator 310 to at least partially separate the solubilized monovalent ions and the solubilized multivalent ions to produce monovalent-ion-enriched stream 230 and multivalent-ion-enriched stream 240. Certain embodiments comprise exposing first side 355 of ion-selective membrane 325 within ion-selective membrane separator 310 to aqueous feed stream 220 (and, optionally, applying a hydraulic pressure to first side 355 of ion-selective membrane 325) such that at least a portion (e.g., at least about 75%, at least about 85%, at least about 90%, at least about 95%, or at least about 99%, on a molar basis) of the solubilized monovalent ions from aqueous feed stream 220 are transported from first side 355 of ion-selective membrane 325, through ion-selective membrane 325, to second side 360 of ion-selective membrane 325. In some such embodiments, at least a portion (e.g., at least about 75%, at least about 85%, at least about 90%, at least about 95%, or at least about 99%, on a molar basis) of the solubilized multivalent ions from aqueous feed stream 220 are prevented from being transported through ion-selective membrane 325, and remain on first side 355 of ion-selective membrane 325. Operation in this manner can result in the creation of multivalent-ion-enriched stream 240 (corresponding to the retentate of ion-selective membrane separator 310) and monovalent-ion-enriched stream 230 (corresponding to the permeate of ion-selective membrane separator 310). At least portions of streams 230 and/or 240 may, according to certain embodiments, be transported to an osmotic membrane separator and processed, for example, as described elsewhere herein.

A variety of ion-selective membranes can be used in the ion-selective membrane separator. Examples of such separators include, but are not limited to, those described above with respect to FIG. 1A.

While the use of ion-selective membrane separators may provide advantages according to certain, but not necessarily all, embodiments, the invention is not limited to the use of such separators, and in other embodiments, other ion-selective separators can be used. For example, in some embodiments, the ion-selective separator comprises an electrodialysis separator. Operation of the electrodialysis separator generally involves the transportation of salt ions from one solution through ion-exchange membranes to another solution under the influence of an applied electric potential difference. In certain embodiments, solubilized monovalent ions and solubilized multivalent ions can be transported at different rates, allowing for at least partially separation of the solubilized monovalent ions and the solubilized multivalent ions. An example of a commercially available electrodialysis separator that can be used, according to certain embodiments, is a 2020EDR system, manufactured by GE.

In some embodiments, the system comprises an osmotic membrane separator fluidically connected to the ion-selective separator. For example, in FIG. 2, osmotic membrane separator 245 is fluidically connected to ion-selective separator 210. The osmotic membrane separator can comprise an osmotic membrane, which can be used to transport at least a portion of the water from the monovalent-ion-enriched stream into at least a portion of the multivalent-ion-enriched stream. For example, in FIG. 2, osmotic membrane separator 245 comprises osmotic membrane 250, which has a first side 255 and a second side 260. Osmotic membrane separator 245 can be used to transport at least a portion of the water within monovalent-ion-enriched stream into at least a portion of the multivalent-ion-enriched stream 240 (e.g., by transporting water from first side 255, through osmotic membrane 250, to second side 260).

In some such embodiments, an ion-selective separator and an osmotic membrane separator are fluidically connected such that the first outlet of the ion-selective separator is fluidically connected to a first side of the osmotic membrane of the osmotic membrane separator, and the second outlet of the ion-selective separator is fluidically connected to the second side of the osmotic membrane of the osmotic membrane separator. For example, referring to FIG. 2, ion-selective separator 210 can be fluidically connected to osmotic membrane separator 245 such that first outlet 225 of ion-selective separator 210 is fluidically connected to first side 255 of osmotic membrane 250, and second outlet 235 of ion-selective separator 210 is fluidically connected to second side 260 of osmotic membrane 250.

In some embodiments, the first outlet of the ion-selective separator is directly fluidically connected to a first side of the osmotic membrane of the osmotic membrane separator. In certain embodiments, the second outlet of the ion-selective separator is directly fluidically connected to the second side of the osmotic membrane of the osmotic membrane separator. For example, in FIGS. 2-3, first outlet 225 of ion-selective separator 210 is directly fluidically connected to first side 255 of osmotic membrane 250, and second outlet 235 of ion-selective separator 210 is directly fluidically connected to second side 260 of osmotic membrane 250

In certain embodiments in which the ion-selective separator comprises an ion-selective membrane separator, the first side of the ion-selective membrane (which can be the retentate side) can be fluidically connected to the second side of the osmotic membrane separator (which can be the permeate side). For example, in FIG. 3, first (retentate) side 355 of ion-selective membrane 325 is fluidically connected to second (permeate) side 260 of osmotic membrane 250. In some such embodiments, the first side of the ion-selective membrane can be directly fluidically connected to the second side of the osmotic membrane separator, as illustrated in FIG. 3. In other embodiments, the fluidic connection between the first side of the ion-selective membrane and the second side of the osmotic membrane can be indirect.

In some embodiments in which the ion-selective separator comprises an ion-selective membrane separator, the second side of the ion-selective membrane separator (which can be the permeate side) can be fluidically connected to the first side of the osmotic membrane separator (which can be the retentate side). For example, in FIG. 3, second (permeate) side 360 of ion-selective membrane 325 is fluidically connected to first (retentate) side 255 of osmotic membrane 250. In some embodiments, the second side of the ion-selective membrane can be directly fluidically connected to the first side of the osmotic membrane separator, as illustrated in FIG. 3. In other embodiments, the fluidic connection between the second side of the ion-selective membrane and the first side of the osmotic membrane can be indirect (e.g., as described in association with FIGS. 4A-4B below).

Certain embodiments comprise transporting at least a portion (e.g., at least about 10 wt %, at least about 25 wt %, at least about 50 wt %, at least about 50 wt %, at least about 75 wt %, at least about 90 wt %, at least about 95 wt %, at least about 98 wt %, or more) of the monovalent-ion-enriched stream across a first side of the osmotic membrane of the osmotic membrane separator and transporting at least a portion (e.g., at least about 10 wt %, at least about 25 wt %, at least about 50 wt %, at least about 50 wt %, at least about 75 wt %, at least about 90 wt %, at least about 95 wt %, at least about 98 wt %, or more) of the multivalent-ion-enriched stream across a second side of the osmotic membrane of the osmotic membrane separator. For example, referring to FIG. 2, certain embodiments comprise transporting at least a portion of monovalent-ion-enriched stream 230 across first side 255 of osmotic membrane 250 of osmotic membrane separator 245 and transporting at least a portion of multivalent-ion-enriched stream 240 across second side 260 of osmotic membrane 250 of osmotic membrane separator 245. According to certain embodiments, at least a portion (e.g., at least about 10 wt %, at least about 25 wt %, at least about 50 wt %, at least about 75 wt %, at least about 90 wt %, at least about 95 wt %, at least about 98 wt %, or more) of the water in the monovalent-ion-enriched stream is transported across a first side of the osmotic membrane of the osmotic membrane separator. For example, in FIG. 2, the portion of monovalent-ion-enriched stream 230 that is transported across first side 255 of osmotic membrane 250 of osmotic membrane separator 245 can contain at least a portion of the water from monovalent-ion-enriched stream 230 that is transported out of ion-selective separator 210. In some such embodiments, at least a portion (e.g., at least about 10%, at least about 25%, at least about 50%, at least about 75%, at least about 90%, at least about 95%, at least about 98%, or more, on a molar basis) of the solubilized monovalent ions within the monovalent-ion-enriched stream is transported across a first side of the osmotic membrane of the osmotic membrane separator. For example, in FIG. 2, the portion of monovalent-ion-enriched stream 230 that is transported across first side 255 of osmotic membrane 250 of osmotic membrane separator 245 can contain at least a portion of the solubilized monovalent ions from monovalent-ion-enriched stream 230 that is transported out of ion-selective separator 210. It may not be necessary in all embodiments, however, to transport solubilized monovalent ions across the first side of the osmotic membrane separator that is used to transport water into the multivalent-ion-enriched stream portion. For example, as described below with respect to FIGS. 4A-4B, in some embodiments, the solubilized monovalent ions may be (although they need not necessarily be) completely separated from the water within the monovalent-ion-enriched stream (e.g., using one or more intermediate osmotic membrane separators) prior to transporting the portion of the water from the monovalent-ion-enriched stream across the osmotic membrane that is used to transport water into at least a portion of the multivalent-ion-enriched stream.

Certain embodiments comprise transporting at least a portion (e.g., at least about 10 wt %, at least about 25 wt %, at least about 50 wt %, at least about 75 wt %, at least about 90 wt %, at least about 95 wt %, at least about 98 wt %, or more) of the multivalent-ion-enriched stream across a second side of the osmotic membrane of the osmotic membrane separator such that at least a portion (e.g., at least about 10 wt %, at least about 25 wt %, at least about 50 wt %, at least about 75 wt %, or more) of the water from the monovalent-ion-enriched stream is transported through the osmotic membrane and into the multivalent-ion-enriched stream. For example, in FIG. 2, at least a portion of multivalent-ion-enriched stream 240 can be transported across second side 260 of osmotic membrane 250 of osmotic membrane separator 245 such that at least a portion of the water from monovalent-ion-enriched stream 230 is transported through osmotic membrane 250 (from first side 255 to second side 260) and into multivalent-ion-enriched stream 240.

Arranging the system such that the monovalent-ion-enriched stream is positioned on one side of the osmotic membrane and the multivalent-ion-enriched stream is positioned on the other side of the osmotic membrane can, according to certain embodiments, enhance the efficiency with which water from the monovalent-ion-enriched stream is transported into the multivalent-ion-enriched stream, relative to the efficiency that could be achieved were water removed from the monovalent-ion-enriched stream in a standalone osmosis process. In particular, according to certain embodiments, the presence of the multivalent ions on the side of the osmotic membrane opposite the monovalent-ion-enriched stream can reduce the amount of hydraulic pressure that needs to be applied to the monovalent-ion-enriched stream to achieve a desired level of separation.

According to certain embodiments, less than about 5% (or, in some embodiments, less than about 2%, less than about 1%, or less than about 0.1%, on a molar basis) of the solubilized monovalent ions within the monovalent-ion-enriched stream are transported through the osmotic membrane during operation of the osmotic membrane separator. For example, referring to FIG. 2, in some embodiments, less than 5% of the solubilized monovalent ions within monovalent-ion-enriched stream 230 are transported from first side 255 of osmotic membrane 250 to second side 260 of osmotic membrane 250 during operation of osmotic membrane separator 245. In some embodiments, less than about 5% (or, in some embodiments, less than about 2%, less than about 1%, or less than about 0.1%, on a molar basis) of the solubilized multivalent ions within the multivalent-ion-enriched stream are transported through the osmotic membrane during operation of the osmotic membrane separator. For example, referring to FIG. 2, in some embodiments, less than 5% of the solubilized multivalent ions within multivalent-ion-enriched stream 240 are transported from second side 260 of osmotic membrane 250 to first side 255 of osmotic membrane 250 during operation of osmotic membrane separator 245.

As noted above, the osmotic membrane separator comprises an osmotic membrane, according to certain embodiments.

The osmotic membrane separator (e.g., osmotic membrane separator 245 in FIG. 2) can be used to perform, according to certain embodiments, a reverse osmosis process. As noted above, reverse osmosis generally occurs when the osmotic pressure on the retentate side of the osmotic membrane is greater than the osmotic pressure on the permeate side of the osmotic membrane, and a hydraulic pressure is applied to the first side of the osmotic membrane such that the hydraulic pressure on the retentate side of the osmotic membrane is sufficiently greater than the hydraulic pressure on the permeate side of the osmotic membrane to cause water to be transported from the retentate side of the osmotic membrane to the permeate side of the osmotic membrane. Operating the osmotic membrane separator to perform reverse osmosis can comprise applying a hydraulic pressure to the retentate side of the osmotic membrane of the osmotic membrane separator. Referring to FIG. 2, for example, osmotic membrane separator 245 can be used to perform reverse osmosis, for example, when the osmotic pressure on first side 255 of osmotic membrane separator 245 is higher than the osmotic pressure on second side 260, a hydraulic pressure is applied to first side 255 such that the hydraulic pressure on first side 255 is higher than the hydraulic pressure on second side 260, and the difference between the hydraulic pressure on first side 255 and the hydraulic pressure on second side 260 is greater than the difference between the osmotic pressure on first side 255 and the osmotic pressure on second side 260. In such cases, water can be transported from first side 255 of osmotic membrane 250 to second side 260 of osmotic membrane 250.

In certain embodiments, the osmotic membrane separator can be used to perform forward osmosis. As noted above, forward osmosis generally occurs when the osmotic pressure on the permeate side of the osmotic membrane is greater than the osmotic pressure on the retentate side of the osmotic membrane such that water is transported from the retentate side of the osmotic membrane to the permeate side of the osmotic membrane. Referring to FIG. 2, in some embodiments, the osmotic membrane separator 245 can be used to perform forward osmosis, for example, when the osmotic pressure on second side 260 of osmotic membrane 250 is greater than the osmotic pressure on first side 255 of osmotic membrane 250, and when the hydraulic pressure gradient from second side 260 to first side 255 ($P_{260}$-$P_{255}$) is not large enough to overcome the difference in the osmotic pressure between first side 255 and second side 260. In such cases, water can be transported from first side 255 of osmotic membrane 250 to second side 260 of osmotic membrane 250.

In some cases, hydraulic pressure may be applied to the retentate side of the osmotic membrane separator to enhance the forward osmosis process. For example, in some instances in which the stream on the first side of the osmotic membrane has a lower osmotic pressure than the stream on the second side of the osmotic membrane, a hydraulic pressure may be applied to the first side of the osmotic membrane such that the hydraulic pressure of the stream on the first side of the osmotic membrane is higher than the hydraulic pressure of the stream on the second side of the osmotic membrane. The applied pressure can increase the rate at which water is transported from the first side of the osmotic membrane to the second side of the osmotic membrane. Such arrangements are sometimes referred to herein as pressure-assisted forward osmosis (which is a particular type of forward osmosis). Referring to FIG. 2, for example, osmotic membrane separator 245 can be used to perform pressure assisted forward osmosis, for example, by applying a hydraulic pressure to first side 255 of osmotic membrane 250 such that the hydraulic pressure of the stream on first side 255 of osmotic membrane 250 is higher than the hydraulic pressure of the stream on second side 260 of osmotic membrane 250. Of course, the use of an applied pressure to enhance forward osmosis is not generally required, and in some embodiments, forward osmosis is performed in the substantial absence of an applied pressure (e.g., such that the hydraulic pressure gradient through the osmotic membrane is less than or equal to about 0.1 bar).

Generally, whether the osmotic membrane separator is used to perform reverse osmosis or forward osmosis is determined by the osmotic pressures of these streams on either side of the osmotic membrane of the osmotic membrane separator. For example, referring to FIG. 2, according to certain embodiments, if the osmotic pressure on first side 255 of osmotic membrane 250 is higher than the osmotic pressure on second side 260 of osmotic membrane 250, and transport of water from first side 255 to second side 260 is desired, reverse osmosis will be performed. On the other hand, in some embodiments, the osmotic pressure on first side 255 of osmotic membrane 250 may be lower than the osmotic pressure on second side 260 of osmotic membrane 250, and transport of water from first side 255 to second side 260 may be desired, in which case, forward osmosis (pressure assisted or otherwise) may be performed.

This osmosis process (e.g., reverse osmosis and/or forward osmosis, and involving the osmotic membrane separator (e.g., separator 245) and/or one or more intermediate osmotic membrane separators) can result, according to certain embodiments, in the production of a monovalent-ion-enriched product stream. The monovalent-ion-enriched product stream can have, according to certain embodiments, a higher osmotic pressure than the monovalent-ion-enriched stream exiting the ion-selective separator (e.g., the ion-selective membrane separator). For example, referring to FIG. 2, in some embodiments, the osmosis process within osmotic membrane separator 245 can result in the production of monovalent-ion-enriched product stream 280, which can have a higher osmotic pressure than monovalent-ion-enriched stream 230. In some embodiments, the monovalent-ion-enriched product stream (e.g., stream 280) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the monovalent-ion-enriched stream (e.g., stream 230). The increase in osmotic pressure can be due, at least in part, to an increase in the concentration of solubilized monovalent ions in the monovalent-ion-enriched product stream, relative to the monovalent-ion-enriched product stream fed to the osmotic membrane separator. For example, the osmosis process can produce, according to certain embodiments, a monovalent-ion-enriched product stream having a higher concentration of solubilized monovalent ions than the monovalent-ion-enriched stream exiting the ion-selective separator (and, in the case of FIG. 2, the concentration of solubilized monovalent ions fed to the osmotic membrane separator). While the multivalent-ion-enriched product streams is shown as exiting first side 255 of osmotic membrane separator 245 in FIG. 2, in other embodiments, the monovalent-ion-enriched product stream may be formed in and exit from an intermediate osmotic membrane separator (e.g., in the embodiments described below with respect to FIGS. 4A-4B).

The osmosis process can also result in the production of a multivalent-ion-enriched product stream having a lower osmotic pressure than the multivalent-ion-enriched stream exiting the ion-selective separator (and/or having a lower osmotic pressure than the multivalent-ion-enriched stream fed to the osmotic membrane separator). For example, in FIG. 2, osmotic membrane separator 245 can be used to perform osmosis such that multivalent-ion-enriched product stream 270 has a lower osmotic pressure than multivalent-ion-enriched stream 240 fed to osmotic membrane separator 245. In some embodiments, the multivalent-ion-enriched stream (e.g., stream 240) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the multivalent-ion-enriched product stream (e.g., stream 270). The decrease in osmotic pressure can be due, at least in part, to a decrease in the concentration of solubilized multivalent ions in the multivalent-ion-enriched product stream, relative to the multivalent-ion-enriched product stream fed to the osmotic membrane separator. For example, the osmosis process can produce, according to certain embodiments, a multivalent-ion-enriched product stream having a lower concentration of solubilized multivalent ions than the multivalent-ion-enriched stream exiting the ion-selective separator (and/or having a lower concentration of solubilized multivalent ions than the multivalent-ion-enriched stream fed to the osmotic membrane separator).

Certain embodiments comprise applying a hydraulic pressure to the stream on the first side of the osmotic membrane (e.g., the monovalent-ion-enriched stream in FIG. 2, or a draw product stream in FIGS. 4A-4B, described below) such that at least a portion of the water from the monovalent-ion-enriched stream is transported through the osmotic membrane and into the multivalent-ion-enriched stream. The hydraulic pressure may be applied, according to certain embodiments, regardless of whether the osmotic membrane separator is used to perform reverse osmosis or forward osmosis. In cases where the osmotic membrane separator is used to perform reverse osmosis, the applied hydraulic pressure can be used as part of the driving force to transport water through the osmotic membrane. In the case of forward osmosis, as mentioned above, application of the hydraulic pressure may enhance the rate at which water is transported through the osmotic membrane.

According to certain embodiments, less than about 5% (or, in some embodiments, less than about 2%, less than about 1%, or less than about 0.1%, on a molar basis) of the solubilized monovalent ions within the monovalent-ion-enriched stream are transported through an osmotic membrane during the osmosis process. For example, referring to FIG. 2, in some embodiments, less than 5% of the solubilized monovalent ions within monovalent-ion-enriched stream 230 are transported from first side 255 of osmotic membrane 250 to second side 260 of osmotic membrane 250 during operation of osmotic membrane separator 245. In some embodiments, less than about 5% (or, in some embodiments, less than about 2%, less than about 1%, or less than about 0.1%, on a molar basis) of the solubilized multivalent ions within the multivalent-ion-enriched stream are transported through an osmotic membrane during operation of osmosis process. For example, referring to FIG. 2, in some embodiments, less than 5% of the solubilized multivalent ions within multivalent-ion-enriched stream 240 are transported from second side 260 of osmotic membrane 250 to first side 255 of osmotic membrane 250 during operation of osmotic membrane separator 245.

According to certain embodiments, transporting at least a portion of the water in the monovalent-ion-enriched stream through the osmotic membrane and into the multivalent-ion-enriched stream produces a multivalent-ion-enriched product stream. For example, referring to FIG. 2, transporting at least a portion of the water in monovalent-ion-enriched stream 230 through osmotic membrane 250 (from first side 255 to second side 260) and into multivalent-ion-enriched stream 240 produces multivalent-ion-enriched product stream 270.

In some embodiments, a relatively large percentage of the solubilized multivalent ions from the aqueous feed stream is present in the multivalent-ion-enriched product stream. For example, in some embodiments, the multivalent-ion-enriched product stream contains at least about 75% (or at least about 85%, at least about 90%, at least about 95%, or at least about 99%, on a molar basis) of the solubilized multivalent ions from the aqueous feed stream. For example, in FIG. 2, multivalent-ion-enriched product stream 270 can contain at least about 75% (or at least about 85%, at least about 90%, at least about 95%, or at least about 99%, on a molar basis) of the solubilized multivalent ions from aqueous feed stream 220.

Transporting at least a portion of the water in the monovalent-ion-enriched stream through the osmotic membrane and into the multivalent-ion-enriched stream can also produce a monovalent-ion-enriched product stream. For example, referring to FIG. 2, transporting at least a portion of the water in monovalent-ion-enriched stream 230 through osmotic membrane 250 (from first side 255 to second side 260) and into multivalent-ion-enriched stream 240 produces monovalent-ion-enriched product stream 280. As noted above, while the multivalent-ion-enriched product streams is shown as exiting first side 255 of osmotic membrane separator 245 in FIG. 2, in other embodiments, the monovalent-ion-enriched product stream may be formed in and exit from an intermediate osmotic membrane separator (e.g., in the embodiments described below with respect to FIGS. 4A-4B).

In some embodiments, the amount of solubilized monovalent ions within the monovalent-ion-enriched product stream is relatively high. For example, in some embodiments, the monovalent-ion-enriched product stream contains at least about 75% (or at least about 85%, at least about 90%, at least about 95%, or at least about 99%, on a molar basis) of the monovalent ions from the aqueous feed stream. For example, in FIG. 2, monovalent-ion-enriched product stream 280 can contain at least about 75% (or at least about 85%, at least about 90%, at least about 95%, or at least about 99%, on a molar basis) of the solubilized monovalent ions from aqueous feed stream 220.

According to certain embodiments, the multivalent-ion-enriched product stream can contain a relatively high amount of solubilized multivalent ions and a relatively low amount of solubilized monovalent ions. For example, in some embodiments, the ratio of solubilized multivalent ions within multivalent-ion-enriched product stream to solubilized monovalent ions within the multivalent-ion-enriched product stream is at least about 3:1, at least about 5:1, at least about 10:1, at least about 50:1, at least about 100:1, at least about 1000:1, at least about 10,000:1, or more. For example, in FIG. 2, the ratio of solubilized multivalent ions within multivalent-ion-enriched product stream 270 to solubilized monovalent ions within multivalent-ion-enriched product stream 270 is at least about 3:1, at least about 5:1, at least about 10:1, at least about 50:1, at least about 100:1, at least about 1000:1, at least about 10,000:1, or more.

According to certain embodiments, the ratio of solubilized multivalent ions within multivalent-ion-enriched product stream to multivalent ions within the monovalent-ion-enriched product stream is at least about 3:1, at least about 5:1, at least about 10:1, at least about 50:1, at least about 100:1, at least about 1000:1, at least about 10,000:1, or more. For example, in FIG. 2, the ratio of solubilized multivalent ions within multivalent-ion-enriched product stream 270 to solubilized multivalent ions within monovalent-ion-enriched product stream 280 is at least about 3:1, at least about 5:1, at least about 10:1, at least about 50:1, at least about 100:1, at least about 1000:1, at least about 10,000:1, or more.

In certain embodiments, the total concentration of solubilized multivalent ions in the multivalent-ion-enriched product stream is at least about 60,000 ppm, at least about 80,000 ppm, or at least about 100,000 ppm (and/or, in some embodiments, up to about 500,000 ppm, or more). Multivalent-ion-enriched product streams with solubilized multivalent ion concentrations outside these ranges could also be produced. For example, in some embodiments, the total concentration of solubilized multivalent ions in the multivalent-ion-enriched product stream is as little as 10,000 ppm, 1000 ppm, 100 ppm, or less.

According to certain embodiments, the monovalent-ion-enriched product stream can contain a relatively high amount of solubilized monovalent ions and a relatively low amount of solubilized multivalent ions. For example, in some embodiments, the ratio of solubilized monovalent ions within monovalent-ion-enriched product stream to solubilized multivalent ions within the monovalent-ion-enriched product stream is at least about 3:1, at least about 5:1, at least about 10:1, at least about 50:1, at least about 100:1, at least about 1000:1, at least about 10,000:1, or more. For example, in FIG. 2, the ratio of solubilized monovalent ions within monovalent-ion-enriched product stream 280 to solubilized multivalent ions within monovalent-ion-enriched product stream 280 is at least about 3:1, at least about 5:1, at least about 10:1, at least about 50:1, at least about 100:1, at least about 1000:1, at least about 10,000:1, or more.

In certain embodiments, the total concentration of solubilized monovalent ions in the monovalent-ion-enriched product stream is at least about 60,000 ppm, at least about 80,000 ppm, or at least about 100,000 ppm (and/or, in some embodiments, up to about 500,000 ppm, or more). Monovalent-ion-enriched product streams with solubilized monovalent ion concentrations outside these ranges could also be produced. For example, in some embodiments, the total concentration of solubilized monovalent ions in the monovalent-ion-enriched product stream is as little as 10,000 ppm, 1000 ppm, 100 ppm, or less.

In some embodiments, the ratio of monovalent ions within the monovalent-ion-enriched product stream to solubilized monovalent ions within the multivalent-ion-enriched product stream is at least about 3:1, at least about 5:1, at least about 10:1, at least about 50:1, at least about 100:1, at least about 1000:1, at least about 10,000:1, or more. For example, in FIG. 2, the ratio of solubilized monovalent ions within monovalent-ion-enriched product stream 280 to solubilized monovalent ions within multivalent-ion-enriched product stream 270 is at least about 3:1, at least about 5:1, at least about 10:1, at least about 50:1, at least about 100:1, at least about 1000:1, at least about 10,000:1, or more.

In some embodiments, a relatively large percentage of the water from the aqueous feed stream is present in the multivalent-ion-enriched product stream. For example, in certain embodiments, multivalent-ion-enriched product stream contains at least about 75 wt % (or at least about 85 wt %, at least about 90 wt %, at least about 95 wt %, or at least about 99 wt %) of the water from the aqueous feed stream. For example, in FIG. 2, multivalent-ion-enriched product stream 270 can contain at least about 75 wt % (or at least about 85 wt %, at least about 90 wt %, at least about 95 wt %, or at least about 99 wt %) of the water from aqueous feed stream 220.

Figure 4A:
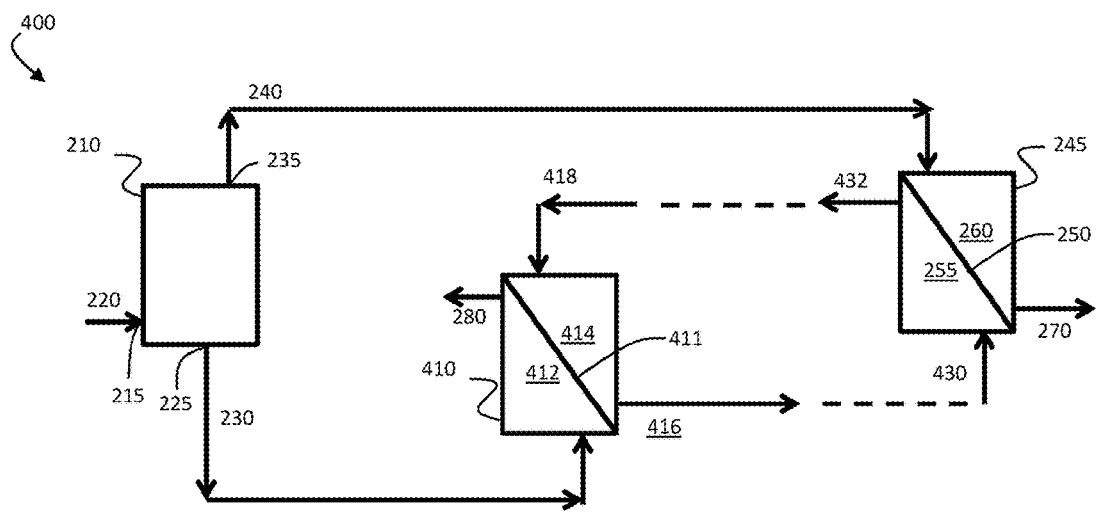
FIG. 4A is, a schematic illustration of a system comprising at least one intermediate osmotic membrane separator, according to some embodiments.

According to certain embodiments, the system comprises multiple osmotic membrane separators. The osmotic membrane separators can be arranged, according to certain embodiments, in series. The series-connected osmotic membrane separators may be arranged, according to certain embodiments, such that water and solubilized monovalent ions are separated via a plurality of successive osmotic separation steps. The use of successive separation steps can be advantageous, for example, when the concentration of solubilized monovalent ions within the monovalent-ion-enriched stream is relatively high and reverse osmosis is being used to separate water and solubilized monovalent ions. In some such cases, the use of multiple osmotic membranes can reduce the minimum amount of hydraulic pressure that needs to be applied to the membranes, resulting in more efficient overall separation. One example of a system including an intermediate osmotic membrane separator is shown in FIG. 4A. In FIG. 4A, system 400 comprises osmotic membrane separator 245 and first intermediate osmotic membrane separator 410. The first intermediate osmotic membrane separator can comprise an osmotic membrane, which can be used to at least partially separate solubilized monovalent ions from water. For example, in FIG. 4A, first intermediate osmotic membrane separator 410 comprises osmotic membrane 411, which has a first side 412 and a second side 414. Additional intermediate osmotic membrane separators can also be employed. For example, in FIG. 4B, system 400 comprises a second intermediate osmotic membrane separator 420, in addition to first intermediate membrane separator 410. Second intermediate osmotic membrane separator 420 comprises osmotic membrane 421, which comprises first side 422 and second side 424.

Accordingly, while FIGS. 2-3 illustrate embodiments in which the first outlet of the ion-selective separator is directly fluidically connected to a first side of the osmotic membrane of the osmotic membrane separator and the second outlet of the ion-selective separator is directly fluidically connected to the second side of the osmotic membrane of the osmotic membrane separator, it should be understood that, in other embodiments, the first outlet of the ion-selective separator may be indirectly fluidically connected to a first side of the osmotic membrane of the osmotic membrane separator and/or the second outlet of the ion-selective separator may be indirectly fluidically connected to the second side of the osmotic membrane of the osmotic membrane separator. For example, in some embodiments, a stream exiting the first outlet of the ion-selective separator (through which the monovalent-ion-enriched stream may be transported, and which may correspond to an outlet from the permeate side of the ion-selective membrane separator, when such separators are used) may pass through one or more intermediate osmotic membrane separators before being transported to the first side of the osmotic membrane. For example, in FIG. 4A, in which system 400 comprises intermediate osmotic membrane separator 410, a fluidic connection between outlet 225 of ion-selective separator 210 and first side 255 of osmotic membrane 250 extends from outlet 225, into intermediate osmotic membrane separator 410 on side 412 of osmotic membrane 411, from first side 412 of osmotic membrane 411 to second side 414 of osmotic membrane 411, and into first side 255 of osmotic membrane 250 via streams 416 and 418. As another example, in FIG. 4B—in which system 450 comprises first intermediate osmotic membrane separator 410 and second intermediate osmotic membrane separator 420 are present—a fluidic connection between outlet 225 of ion-selective separator 210 and first side 255 of osmotic membrane 250 extends from outlet 225, into first intermediate osmotic membrane separator 410 on side 412 of osmotic membrane 411, from first side 412 of osmotic membrane 411 to second side 414 of osmotic membrane 411, into first side 422 of osmotic membrane 421 of second intermediate osmotic membrane separator 420 via streams 416 and 418, from first side 422 of osmotic membrane 421 to second side 424 of osmotic membrane 421, and into first side 255 of osmotic membrane 250 via streams 426 and 428.

Figure 4B:
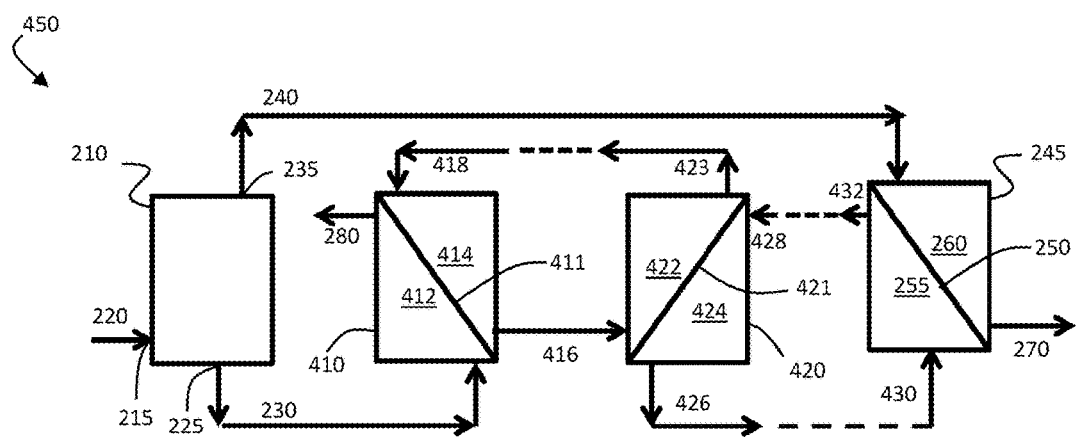
FIG. 4B is, according to certain embodiments, a schematic illustration of a system comprising at least two intermediate osmotic membrane separators.

According to certain embodiments, transporting at least a portion of the water from the monovalent-ion-enriched stream across the first (retentate) side of the osmotic membrane (and, subsequently, into at least a portion of the multivalent-ion-enriched stream) comprises transporting at least a portion of water from the monovalent-ion-enriched stream through at least one intermediate osmotic membrane separator. Examples of such processes are shown in FIGS. 4A-4B, and are described in more detail below. Employing multi-stage osmotic membrane separation may be useful, for example, when the monovalent-ion-enriched stream has a relatively high concentration of solubilized monovalent ions, and reverse osmosis is being used to separate solubilized monovalent ions and water within the monovalent-ion-enriched stream. Such situations may arise, for example, in certain cases in which produced water or other high-salinity aqueous streams are used as the aqueous feed stream. In some such cases, transporting water from the monovalent-ion-enriched stream through a series of multiple osmotic membrane separators (rather than transporting all or a portion of the monovalent-ion-enriched stream directly to the osmotic membrane separator to which a portion of the multivalent-ion-enriched stream is transported) can reduce the minimum applied hydraulic pressure needed to achieve effective osmotic separation. As an exemplary, non-limiting illustration, if one desires to remove monovalent ions from a monovalent-ion-enriched stream with an osmotic pressure of 60 bar using a single osmotic membrane and without having a saline stream on the opposite side of the osmotic membrane, one would need to use a mechanically robust osmotic membrane capable of withstanding very high hydraulic pressures (e.g., above 60 bar). Such membranes are typically difficult and expensive to manufacture. Certain embodiments employ the recognition that the use of multiple reverse osmosis membranes, each operated using relatively low hydraulic pressure gradients applied across the osmotic membrane, can be used to perform a stepwise process in which each reverse osmosis step gradually increases the purity of water until the desired final level of water purity is achieved. In addition, certain embodiments employ the recognition that the use of one or more draw streams including a solubilized species (e.g., ion or non-ion species) that raises the osmotic pressure of the draw stream(s) can lower the differential hydraulic pressure required to transport water across a given osmotic membrane.

Accordingly, in certain embodiments, at least a portion of the monovalent-ion-enriched stream is transported to at least one intermediate osmotic membrane separator before a portion of the monovalent-ion-enriched stream is transported to the osmotic membrane separator to which a portion of the multivalent-ion-enriched stream is transported. Certain embodiments comprise transporting at least a portion (e.g., at least about 10 wt %, at least about 25 wt %, at least about 50 wt %, at least about 75 wt %, at least about 90 wt %, at least about 95 wt %, at least about 98 wt %, or more) of the monovalent-ion-enriched stream across a first side of the osmotic membrane of an intermediate osmotic membrane separator. For example, in FIG. 4A, at least a portion of monovalent-ion-enriched stream 230 can be transported across first side 412 of osmotic membrane 411 of intermediate osmotic membrane separator 410. In some such embodiments, at least a portion (e.g., at least about 10 wt %, at least about 25 wt %, at least about 50 wt %, at least about 75 wt %, at least about 90 wt %, at least about 95 wt %, at least about 98 wt %, or more) of the water in the monovalent-ion-enriched stream is transported across a first side of the osmotic membrane of the intermediate osmotic membrane separator. For example, in FIG. 4A, the portion of monovalent-ion-enriched stream 230 that is transported across first side 412 of osmotic membrane 411 of intermediate osmotic membrane separator 410 can contain at least a portion of the water from monovalent-ion-enriched stream 230 that is transported out of ion-selective separator 210. In some such embodiments, at least a portion (e.g., at least about 10 wt %, at least about 25%, at least about 50%, at least about 75%, at least about 90%, at least about 95%, at least about 98%, or more, on a molar basis) of the solubilized monovalent ions within the monovalent-ion-enriched stream is transported across a first side of the osmotic membrane of the intermediate osmotic membrane separator. For example, in FIG. 4A, the portion of monovalent-ion-enriched stream 230 that is transported across first side 412 of osmotic membrane 411 of intermediate osmotic membrane separator 410 can contain at least a portion of the solubilized monovalent ions from monovalent-ion-enriched stream 230 that is transported out of ion-selective separator 210.

Certain embodiments comprise transporting at least a portion of a draw inlet stream across the second side of the osmotic membrane of the intermediate osmotic separator. For example, in FIG. 4A, draw inlet stream 418 can be transported across second side 414 of osmotic membrane 411 of intermediate osmotic membrane separator 410. The draw inlet stream (e.g., stream 418 in FIG. 4A) can comprise, according to certain embodiments, any component(s) suitable for imparting an appropriate osmotic pressure to perform the osmotic membrane separations described herein. In some embodiments, the draw inlet stream is an aqueous solution comprising one or more solubilized species, such as one or more dissolved ions and/or one or more dissociated molecules. For example, in some embodiments, the draw inlet stream comprises $Na^+$, $Mg^{2+}$, $Ca^{2+}$, $Sr^{2+}$, $Ba^{2+}$, and/or $Cl^-$. In some embodiments, the draw inlet stream comprises at least one solubilized monovalent cation, such as $Na^+$ and/or $K^+$. In certain embodiments, the draw inlet stream comprises at least one solubilized monovalent anion, such as $Cl^-$ and/or $Br^-$. Cations and/or anions having other valencies may also be present in the draw inlet stream. Other species could also be used in the draw stream. For example, in some embodiments, the draw inlet stream can be an aqueous stream comprising a solubilized non-ionic species, such as ammonia ($NH_3$). The draw inlet stream may be prepared, according to certain embodiments, by suspending and/or dissolving one or more species in a solvent, such as an aqueous solvent) to solubilize the species in the solvent. For example, in some embodiments, one or more draw inlet streams can be made by dissolving one or more solid salts in an aqueous solvent. Non-limiting examples of salts that may be dissolved in water include $NaCl$, $CaCl_2$, $MgCl_2$, and the like. In some embodiments, the draw stream can be prepared by mixing ammonia with water.

Certain embodiments comprise applying a hydraulic pressure to the first side of the osmotic membrane of the intermediate osmotic membrane separator such that water is transported from the first side of the intermediate osmotic separator (from the monovalent-ion-enriched stream) to the second side of the intermediate osmotic membrane separator. For example, in FIG. 4A, a hydraulic pressure can be applied to first side 412 of osmotic membrane 411 of intermediate osmotic membrane separator 410 such that at least a portion of water from monovalent-ion-enriched stream 230 is transported from first side 412, through osmotic membrane 411, to second side 414. In some embodiments, water transported through the osmotic membrane of the intermediate osmotic membrane separator can be combined with the draw inlet stream to produce a draw product stream. For example, in FIG. 4A, water transported from first side 412 to the second side 414 of osmotic membrane 411 can be combined with draw inlet stream 418 to produce draw product stream 416. The draw product stream can have a lower osmotic pressure than the draw inlet stream. For example, in FIG. 4A, draw product stream 416 can have a lower osmotic pressure than draw inlet stream 418. In some embodiments, the draw inlet stream (e.g., stream 418) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the draw product stream (e.g., stream 416). Operation of the intermediate osmotic membrane separator can also produce a monovalent-ion-enriched product stream, which can have a higher osmotic pressure than the monovalent-ion-enriched stream from the ion-selective separator. For example, referring to FIG. 4A, operation of intermediate osmotic membrane separator 410 can result in the production of monovalent-ion-enriched product stream 280, which can have a higher osmotic pressure than monovalent-ion-enriched stream 230. In some embodiments, the monovalent-ion-enriched product stream (e.g., stream 280) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the monovalent-ion-enriched stream (e.g., stream 230).

Certain embodiments comprise transporting at least a portion (e.g., at least about 10 wt %, at least about 25 wt %, at least about 50 wt %, at least about 75 wt %, at least about 90 wt %, at least about 95 wt %, at least about 98 wt %, or more) of the draw product stream (which itself, as described above, may contain at least a portion of the monovalent-ion-enriched stream, such as at least a portion of the water from the monovalent-ion-enriched stream) across a first side of the osmotic membrane of an osmotic membrane separator and transporting at least a portion (e.g., at least about 10 wt %, at least about 25 wt %, at least about 50 wt %, at least about 75 wt %, at least about 90 wt %, at least about 95 wt %, at least about 98 wt %, or more) of the multivalent-ion-enriched stream across a second side of the osmotic membrane of the osmotic membrane separator. For example, referring to FIG. 4A, certain embodiments comprise transporting at least a portion of draw product stream 416 across first side 255 of osmotic membrane 250 of osmotic membrane separator 245 and transporting at least a portion of multivalent-ion-enriched stream 240 across second side 260 of osmotic membrane 250 of osmotic membrane separator 245.

In some embodiments, all or a portion of the draw product stream can be transported directly to the first side of the osmotic membrane of the osmotic membrane separator. For example, in FIG. 4A, all or a portion of draw product stream 416 can be transported directly to first side 255 of osmotic membrane 250 of osmotic membrane separator 245, in which case inlet stream 430 corresponds to draw product stream 416. In other embodiments, one or more additional intermediate osmotic membrane separators may be used to process draw products stream 416, in which case, inlet stream 430 could contain a portion of the water within draw product stream 416, but would not be directly fluidically connected to draw product stream 416. One example of such a process is shown in FIG. 4B, and is described in more detail below.

According to certain embodiments, at least a portion (e.g., at least about 10 wt %, at least about 25 wt %, at least about 50 wt %, at least about 75 wt %, at least about 90 wt %, at least about 95 wt %, at least about 98 wt %, or more) of the water in the draw product stream is transported across a first side of the osmotic membrane of the osmotic membrane separator. For example, in FIG. 4A, the portion of the draw product stream that is transported through stream 430 and across first side 255 of osmotic membrane 250 of osmotic membrane separator 245 can contain at least a portion of the water from draw product stream 416 that is transported out of intermediate osmotic membrane separator 410.

In some such embodiments, at least a portion (e.g., at least about 10%, at least about 25%, at least about 50%, at least about 75%, at least about 90%, at least about 95%, at least about 98%, or more, on a molar basis) of a solubilized species (e.g., an ion or non-ion solubilized species) within the draw product stream is transported across a first side of the osmotic membrane of the osmotic membrane separator. For example, in FIG. 4A, the portion of draw product stream that is transported through stream 430 and across first side 255 of osmotic membrane 250 of osmotic membrane separator 245 can contain at least a portion of a solubilized species present within draw product stream 416 that is transported out of intermediate osmotic membrane separator 410. It may not be necessary in all embodiments, however, to transport solubilized species from the first draw product stream across the first side of the osmotic membrane separator that is used to transport water into the multivalent-ion-enriched stream portion. For example, as described below with respect to FIG. 4B, in some embodiments, the solubilized species within the draw product stream may be (although they need not necessarily be) completely separated from the water within the draw product stream (e.g., using one or more additional intermediate osmotic membrane separators) prior to transporting the portion of the water from the draw product stream across the osmotic membrane that is used to transport water into at least a portion of the multivalent-ion-enriched stream.

Certain embodiments comprise transporting at least a portion (e.g., at least about 10 wt %, at least about 25 wt %, at least about 50 wt %, at least about 75 wt %, at least about 90 wt %, at least about 95 wt %, at least about 98 wt %, or more) of the multivalent-ion-enriched stream across a second side of the osmotic membrane of the osmotic membrane separator such that at least a portion (e.g., at least about 10 wt %, at least about 25 wt %, at least about 50 wt %, at least about 75 wt %, or more) of the water from the draw product stream is transported through the osmotic membrane and into the multivalent-ion-enriched stream. For example, in FIG. 4A, at least a portion of multivalent-ion-enriched stream 240 can be transported across second side 260 of osmotic membrane 250 of osmotic membrane separator 245 such that at least a portion of the water from draw product stream 416 is transported through osmotic membrane 250 (from first side 255 to second side 260) and into multivalent-ion-enriched stream 240.

In some embodiments, operation of the osmotic membrane separator within which water is added to the multivalent-ion-enriched stream generates a stream exiting the first side of the osmotic membrane and having a higher osmotic pressure than the stream fed to the first side of the osmotic membrane. For example, referring to FIG. 4A, in some embodiments, operation of osmotic membrane separator 245 (within which water is added to multivalent-ion-enriched stream 240) generates stream 432 exiting first side 255 of osmotic membrane 250 and having a higher osmotic pressure than stream 430 fed to first side 255 of osmotic membrane 250. In some such embodiments, the product stream from the first side of the osmotic membrane separator (e.g., stream 432) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the draft product stream fed to the first side of the osmotic membrane separator (e.g., stream 430)

According to certain embodiments, less than about 5% (or, in some embodiments, less than about 2%, less than about 1%, or less than about 0.1%, on a molar basis) of the solubilized species within a draw product stream are transported through the osmotic membrane during operation of the osmotic membrane separator used to add water to the multivalent-ion-enriched stream. For example, referring to FIG. 4A, in some embodiments, less than 5% of the solubilized species within stream 430 (which may originate from, for example, stream 416 or the draw product stream of another intermediate osmotic membrane separator) are transported from first side 255 of osmotic membrane 250 to second side 260 of osmotic membrane 250 during operation of osmotic membrane separator 245. In some embodiments, less than about 5% (or, in some embodiments, less than about 2%, less than about 1%, or less than about 0.1%, on a molar basis) of the solubilized multivalent ions within the multivalent-ion-enriched stream are transported through the osmotic membrane during operation of the osmotic membrane separator. For example, referring to FIG. 4A, in some embodiments, less than 5% of the solubilized multivalent ions within multivalent-ion-enriched stream 240 are transported from second side 260 of osmotic membrane 250 to first side 255 of osmotic membrane 250 during operation of osmotic membrane separator 245.

The intermediate osmotic membrane separator can be operated as a reverse osmosis membrane separator, according to certain embodiments. That is to say, in some embodiments, water can be transported from the first side of the osmotic membrane of the intermediate osmotic membrane separator to the second side of the osmotic membrane of the intermediate osmotic membrane separator by applying a hydraulic pressure to the first side of the membrane as a driving force, such that local osmotic pressure gradients through the thickness of the membrane that would otherwise favor the transport of water from the second side of the membrane to the first side of the membrane are overcome by the applied hydraulic pressure. In some embodiments, the osmotic pressure of the stream on the first side of the osmotic membrane of the intermediate osmotic membrane separator can be higher than the osmotic pressure of the stream on the second side of the osmotic membrane of the intermediate osmotic membrane separator, such that water is transported through the osmotic membrane due to a hydraulic pressure applied to the first side of the osmotic membrane.

In certain embodiments, two or more intermediate osmotic membrane separators can be used in the system. In certain embodiments, at least a portion of the draw product stream from the first intermediate osmotic membrane separator (e.g., intermediate osmotic membrane separator 410 in FIGS. 4A-4B) is transported to at least one additional intermediate osmotic membrane separator before a portion of the draw product stream is transported to the osmotic membrane separator to which a portion of the multivalent-ion-enriched stream is transported. Certain embodiments comprise transporting at least a portion (e.g., at least about 10 wt %, at least about 25 wt %, at least about 50 wt %, at least about 75 wt %, at least about 90 wt %, at least about 95 wt %, at least about 98 wt %, or more) of the draw product stream from the first intermediate osmotic membrane separator across a first side of the osmotic membrane of a second intermediate osmotic membrane separator. For example, in FIG. 4B, at least a portion of draw product stream 416 from first intermediate osmotic membrane separator 410 can be transported across first side 422 of osmotic membrane 421 of second intermediate osmotic membrane separator 420. In some such embodiments, at least a portion (e.g., at least about 10 wt %, at least about 25 wt %, at least about 50 wt %, at least about 75 wt %, at least about 90 wt %, at least about 95 wt %, at least about 98 wt %, or more) of the water in the draw product stream from the first intermediate osmotic membrane separator is transported across a first side of the osmotic membrane of the second intermediate osmotic membrane separator. For example, in FIG. 4B, the portion of draw product stream 416 that is transported across first side 422 of osmotic membrane 421 of second intermediate osmotic membrane separator 420 can contain at least a portion of the water from draw product stream 416 from first intermediate osmotic membrane separator 410. In some such embodiments, at least a portion (e.g., at least about 10 wt %, at least about 25%, at least about 50%, at least about 75%, at least about 90%, at least about 95%, at least about 98%, or more, on a molar basis) of the solubilized species (e.g., ion or non-ion solubilized species) within the draw product stream from the first intermediate osmotic membrane separator is transported across a first side of the osmotic membrane of the second intermediate osmotic membrane separator. For example, in FIG. 4B, the portion of draw product stream 416 from intermediate osmotic membrane separator 410 that is transported across first side 422 of osmotic membrane 421 of intermediate osmotic membrane separator 420 can contain at least a portion of the solubilized species from draw product stream 416 that is transported out of first intermediate osmotic membrane separator 410.

Certain embodiments comprise transporting at least a portion of a second draw inlet stream across the second side of the osmotic membrane of the second intermediate osmotic membrane separator. For example, in FIG. 4B, second draw inlet stream 428 can be transported across second side 424 of osmotic membrane 421 of second intermediate osmotic membrane separator 420. Certain embodiments comprise applying a hydraulic pressure to the first side of the osmotic membrane of the second intermediate osmotic membrane separator such that water is transported from the first side of the second intermediate osmotic separator (from the first draw product stream) to the second side of the osmotic membrane of the second intermediate osmotic membrane separator. For example, in FIG. 4B, a hydraulic pressure can be applied to first side 422 of osmotic membrane 421 of second intermediate osmotic membrane separator 420 such that at least a portion of water from draw product stream 416 is transported from first side 422, through osmotic membrane 421, to second side 424. In some embodiments, water transported through the osmotic membrane of the second intermediate osmotic membrane separator can be combined with the second draw inlet stream to produce a second draw product stream. For example, in FIG. 4B, water transported from first side 422 to second side 424 of osmotic membrane 421 can be combined with second draw inlet stream 428 to produce second draw product stream 426. The second draw product stream can have a lower osmotic pressure than the second draw inlet stream. For example, in FIG. 4B, second draw product stream 426 can have a lower osmotic pressure than second draw inlet stream 428. In some embodiments, the second draw inlet stream (e.g., stream 428) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the second draw product stream (e.g., stream 426). Operation of the second intermediate osmotic membrane separator can also produce a product stream having a higher osmotic pressure than the first draw product stream from the first intermediate osmotic membrane separator. For example, referring to FIG. 4B, operation of second intermediate osmotic membrane separator 420 can result in the production of product stream 423, which can have a higher osmotic pressure than first draw product stream 416. In some embodiments, the product stream (e.g., stream 423) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the first draw product stream (e.g., stream 416).

The second draw inlet stream can include solubilized species (e.g., solubilized ion species) that are the same as or different from those present in the first draw inlet stream. In certain embodiments, the osmotic pressure of the first draw inlet stream can be higher than the osmotic pressure of the second draw inlet stream. For example, in some embodiments, the first draw inlet stream (e.g., stream 418) can have an osmotic pressure that is at least about 1.01 times, at least about 1.1 times, at least about 1.5 times, at least about 2 times, or at least about 5 times (and/or, in some embodiments, up to about 10 times, up to about 100 times, up to about 500 times, up to about 1000 times, up to about 5000 times, or more) the osmotic pressure of the second draw inlet stream (e.g., stream 428). In some embodiments, the total molar concentration (in units of molarity) of solubilized species (e.g., solubilized ions) in the second draw inlet stream is lower than the total molar concentration of solubilized species (e.g., solubilized ions) in the first draw inlet stream.

Certain embodiments comprise transporting at least a portion (e.g., at least about 10 wt %, at least about 25 wt %, at least about 50 wt %, at least about 75 wt %, at least about 90 wt %, at least about 95 wt %, at least about 98 wt %, or more) of the second draw product stream (which itself, as described above, may contain at least a portion of the first draw product stream and at least a portion of the monovalent-ion-enriched stream, such as at least a portion of the water from the first draw product stream and/or the monovalent-ion-enriched stream) across a first side of the osmotic membrane of an osmotic membrane separator and transporting at least a portion (e.g., at least about 10 wt %, at least about 25 wt %, at least about 50 wt %, at least about 75 wt %, at least about 90 wt %, at least about 95 wt %, at least about 98 wt %, or more) of the multivalent-ion-enriched stream across a second side of the osmotic membrane of the osmotic membrane separator. For example, referring to FIG. 4B, certain embodiments comprise transporting at least a portion of second draw product stream 426 across first side 255 of osmotic membrane 250 of osmotic membrane separator 245 and transporting at least a portion of multivalent-ion-enriched stream 240 across second side 260 of osmotic membrane 250 of osmotic membrane separator 245.

In some embodiments, all or a portion of the second draw product stream can be transported directly to the first side of the osmotic membrane of the osmotic membrane separator. For example, in FIG. 4B, all or a portion of second draw product stream 426 can be transported directly to first side 255 of osmotic membrane 250 of osmotic membrane separator 245, in which case inlet stream 430 corresponds to second draw product stream 426. In other embodiments, one or more additional intermediate osmotic membrane separators may be used to process second draw product stream 426, in which case, inlet stream 430 could contain a portion of the water within second draw product stream 426, but would not be directly fluidically connected to second draw product stream 426.

According to certain embodiments, at least a portion (e.g., at least about 10 wt %, at least about 25 wt %, at least about 50 wt %, at least about 75 wt %, at least about 90 wt %, at least about 95 wt %, at least about 98 wt %, or more) of the water in the second draw product stream is transported across a first side of the osmotic membrane of the osmotic membrane separator. For example, in FIG. 4B, the portion of the second draw product stream that is transported across first side 255 of osmotic membrane 250 of osmotic membrane separator 245 can contain at least a portion of the water from second draw product stream 426 that is transported out of second intermediate osmotic membrane separator 420.

In some such embodiments, at least a portion (e.g., at least about 10 wt %, at least about 25 wt %, at least about 50%, at least about 75%, at least about 90%, at least about 95%, at least about 98%, or more, on a molar basis) of a solubilized species (e.g., an ion or non-ion solubilized species) within the second draw product stream is transported across a first side of the osmotic membrane of the osmotic membrane separator. For example, in FIG. 4B, the portion of second draw product stream 426 that is transported across first side 255 of osmotic membrane 250 of osmotic membrane separator 245 can contain at least a portion of a solubilized species present within second draw product stream 426 that is transported out of intermediate osmotic membrane separator 420. It may not be necessary in all embodiments, however, to transport solubilized species from the second draw product stream across the first side of the osmotic membrane separator that is used to transport water into the multivalent-ion-enriched stream portion. For example, in some embodiments, the solubilized species within the draw product stream may be (although they need not necessarily be) completely separated from the water within the second draw product stream (e.g., using one or more additional intermediate osmotic membrane separators) prior to transporting the portion of the water from the second draw product stream across the osmotic membrane that is used to transport water into at least a portion of the multivalent-ion-enriched stream.

Certain embodiments comprise transporting at least a portion (e.g., at least about 10 wt %, at least about 25 wt %, at least about 50 wt %, at least about 75 wt %, at least about 90 wt %, at least about 95 wt %, at least about 98 wt %, or more) of the multivalent-ion-enriched stream across a second side of the osmotic membrane of the osmotic membrane separator such that at least a portion (e.g., at least about 25 wt %, at least about 50 wt %, at least about 75 wt %, or more) of the water from the second draw product stream is transported through the osmotic membrane and into the multivalent-ion-enriched stream. For example, in FIG. 4B, at least a portion of multivalent-ion-enriched stream 240 can be transported across second side 260 of osmotic membrane 250 of osmotic membrane separator 245 such that at least a portion of the water from second draw product stream 426 is transported through osmotic membrane 250 (from first side 255 to second side 260) and into multivalent-ion-enriched stream 240.

In some embodiments, operation of the osmotic membrane separator within which water is added to the multivalent-ion-enriched stream generates a stream exiting the first side of the osmotic membrane and having a higher osmotic pressure than the stream fed to the first side of the osmotic membrane. For example, referring to FIG. 4B, in some embodiments, operation of osmotic membrane separator 245 (within which water is added to multivalent-ion-enriched stream 240) generates stream 432 exiting first side 255 of osmotic membrane 250 and having a higher osmotic pressure than stream 430 fed to first side 255 of osmotic membrane 250. In some such embodiments, the product stream from the first side of the osmotic membrane separator (e.g., stream 432) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the draft product stream fed to the first side of the osmotic membrane separator (e.g., stream 430)

According to certain embodiments, less than about 5% (or, in some embodiments, less than about 2%, less than about 1%, or less than about 0.1%, on a molar basis) of the solubilized species within a draw product stream are transported through the osmotic membrane during operation of the osmotic membrane separator used to add water to the multivalent-ion-enriched stream. For example, referring to FIG. 4A, in some embodiments, less than 5% of the solubilized species within stream 430 (which may originate from, for example, stream 426 or the draw product stream of another intermediate osmotic membrane separator) are transported from first side 255 of osmotic membrane 250 to second side 260 of osmotic membrane 250 during operation of osmotic membrane separator 245. According to certain embodiments, less than about 5% (or, in some embodiments, less than about 2%, less than about 1%, or less than about 0.1%, on a molar basis) of the solubilized species within the second draw product stream are transported through the osmotic membrane during operation of the osmotic membrane separator used to add water to the multivalent-ion-enriched stream. For example, referring to FIG. 4B, in some embodiments, less than 5% of the solubilized species within second draw product stream 426 are transported from first side 255 of osmotic membrane 250 to second side 260 of osmotic membrane 250 during operation of osmotic membrane separator 245. In some embodiments, less than about 5% (or, in some embodiments, less than about 2%, less than about 1%, or less than about 0.1%, on a molar basis) of the solubilized multivalent ions within the multivalent-ion-enriched stream are transported through the osmotic membrane during operation of the osmotic membrane separator. For example, referring to FIG. 4B, in some embodiments, less than 5% of the solubilized multivalent ions within multivalent-ion-enriched stream 240 are transported from second side 260 of osmotic membrane 250 to first side 255 of osmotic membrane 250 during operation of osmotic membrane separator 245.

The second intermediate osmotic membrane separator can be operated as a reverse osmosis membrane separator, according to certain embodiments. That is to say, in some embodiments, water can be transported from the first side of the osmotic membrane of the second intermediate osmotic membrane separator to the second side of the osmotic membrane of the second intermediate osmotic membrane separator by applying a hydraulic pressure to the first side of the membrane as a driving force, such that local osmotic pressure gradients through the thickness of the membrane that would otherwise favor the transport of water from the second side of the membrane to the first side of the membrane are overcome by the applied hydraulic pressure. In some embodiments, the osmotic pressure of the stream on the first side of the osmotic membrane of the second intermediate osmotic membrane separator can be higher than the osmotic pressure of the stream on the second side of the osmotic membrane of the second intermediate osmotic membrane separator, such that water is transported through the osmotic membrane due to a hydraulic pressure applied to the first side of the osmotic membrane.

While embodiments with a single intermediate osmotic membrane separator and two intermediate osmotic membrane separators have been described, additional intermediate osmotic membrane separators can be used, according to certain embodiments.

According to certain embodiments, streams within the system can be recycled. For example, in certain embodiments, at least a portion of the product stream from the first side of the osmotic membrane separator is recycled to the second side of the first intermediate osmotic membrane separator. For example, in FIG. 4A, in some embodiments, at least a portion of product stream 432 is transported to second side 414 of intermediate osmotic membrane separator 410 via draw inlet stream 418. According to certain embodiments, at least a portion of the product stream from the first side of the osmotic membrane separator is recycled to the second side of the second intermediate osmotic membrane separator. For example, in FIG. 4B, in some embodiments, at least a portion of product stream 432 is transported to second side 424 of second intermediate osmotic membrane separator 420 via draw inlet stream 428. In some embodiments, at least a portion of the product stream from the first side of the second intermediate osmotic membrane separator is recycled to the second side of the first intermediate osmotic membrane separator. For example, in FIG. 4B, in some embodiments, at least a portion of product stream 423 is transported to second side 414 of first intermediate osmotic membrane separator 410 via draw inlet stream 418. Recycling of the streams in this manner can, according to certain although not necessarily all embodiments, simplify operation of the desalination system, reduce the volume of waste generated by the desalination system, and allow steady-state operation to be achieved more easily.

One advantage of certain, although not necessarily all, embodiments is that one or more of the osmotic-membrane-based separation steps can be performed to achieve a desired degree of separation while using relatively low transmembrane osmotic pressure gradients. Such low transmembrane osmotic pressure gradients can be advantageous, for example, in certain cases in which reverse osmosis is used to perform separations, as relatively low transmembrane osmotic pressure gradients can allow one to perform separations using relatively low applied hydraulic pressures, thus potentially reducing energy requirements and/or equipment costs compared to higher hydraulic pressure applications. In some embodiments, at at least one location on the osmotic membrane of the osmotic membrane separator, the difference between an osmotic pressure on a first side of the first osmotic membrane and an osmotic pressure on a second side of the first osmotic membrane (i.e., opposite the first side of the first osmotic membrane) is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more).

For example, in FIG. 1A, in some embodiments, at at least one location on osmotic membrane 130, the difference between an osmotic pressure on first side 132 of osmotic membrane 130 and an osmotic pressure on second side 134 of osmotic membrane 130 is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). As another example, in FIGS. 2, 3, 4A, and/or 4B, in some embodiments, at at least one location on osmotic membrane 250, the difference between an osmotic pressure on first side 255 of osmotic membrane 250 and an osmotic pressure on second side 260 of osmotic membrane 250 is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). As yet another example, in FIGS. 4A and/or 4B, in some embodiments, at at least one location on osmotic membrane 411, the difference between an osmotic pressure on first side 412 of osmotic membrane 411 and an osmotic pressure on second side 414 of osmotic membrane 411 is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). As yet another example, in FIG. 4B, in some embodiments, at at least one location on osmotic membrane 421, the difference between an osmotic pressure on first side 422 of osmotic membrane 421 and an osmotic pressure on second side 424 of osmotic membrane 421 is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more).

According to certain embodiments, the transmembrane osmotic pressure gradient spatially-averaged across the facial area of one or more of the osmotic membranes (e.g., such as osmotic membrane 130 in FIG. 1A; osmotic membrane 250 in FIGS. 2, 3, and 4A-4B; osmotic membrane 411 in FIGS. 4A-4B; and/or osmotic membrane 421 in FIG. 4B)) is relatively small. The spatially-averaged transmembrane osmotic pressure gradient across a facial area of a particular osmotic membrane can be calculated by measuring the osmotic pressure at all points along the facial area of the first side of the osmotic membrane, measuring the osmotic pressure at all points along the facial area of the second side of the osmotic membrane, and calculating the two-dimensional distribution (across the facial area of the membrane) of the transmembrane osmotic pressure gradient (by subtracting, at each point across the facial area of the osmotic membrane, the osmotic pressure on the second side of the osmotic membrane from the osmotic pressure on the opposite point on the first side of the osmotic membrane). One can then spatially average the two-dimensional distribution of the transmembrane osmotic pressure gradient. In certain embodiments, the transmembrane osmotic pressure gradient, spatially-averaged across the facial area of the membrane, for one or more of the osmotic membranes within the system is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more).

Achieving a relatively low spatially-averaged transmembrane osmotic pressure gradient across a facial area of an osmotic membrane can be achieved, for example, by controlling the osmotic pressure of the streams fed to either side of the osmotic membrane (e.g., by controlling salt types and/or salt concentrations within the streams). According to certain embodiments, the difference between the osmotic pressure within the monovalent-ion-enriched stream fed to the first intermediate osmotic membrane separator and the osmotic pressure within the first draw product stream is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). In certain embodiments, the difference between the osmotic pressure of the first draw product stream and the osmotic pressure of the second draw product stream is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more).

According to certain embodiments, the streams on either side of an osmotic membrane can be operated in counter-current configuration. Operation of the osmotic membrane separators in this manner can, according to certain but not necessarily all embodiments, allow for more efficient operation of the osmotic membrane separator. An example of counter-current flow is illustrated in FIG. 1A, in which aqueous feed stream 160 is transported across first side 132 of osmotic membrane 130 in the direction of arrow 136 while monovalent-ion-enriched stream 150 is transported across second side 134 of osmotic membrane 130 in a direction opposite of the direction of arrow 136. It should be understood that two streams do not have to be transported in perfectly parallel and opposite directions to be considered to be in counter-current configuration, and in some embodiments, the primary flow directions of two streams that are in a counter-current flow configuration can form an angle of up to about 10° (or, in some cases, up to about 5°, up to about 2°, or up to about 1°). In certain embodiments, the streams on either side of osmotic membrane 130 (in FIG. 1A), osmotic membrane 250 (in FIGS. 2, 3, and 4A-4B), osmotic membrane 411 (in FIGS. 4A-4B), and/or osmotic membrane 421 (in FIG. 4B) are transported across the osmotic membrane in a counter-current configuration.

It should be understood that, where a single membrane is shown or described, such single membranes could be replaced with multiple, parallel-connected osmotic membranes. The use of multiple, parallel-connected osmotic membranes can, for example, increase the capacity of the system.

In some embodiments, at least a portion of the energy used to pressurize one or more streams (e.g., for performing reverse osmosis) is recovered from the system. The recovered energy may be used, for example, to heat and/or pressurize another stream within the desalination system. Certain embodiments comprise, for example, increasing the pressure of the aqueous feed stream, before the aqueous feed stream is transported into the ion-selective separator, using at least a portion of the pressure of at least one retentate product stream from an osmotic membrane separator.

Energy from a pressurized stream can be recovered via any suitable method. For example, in some embodiments, a pressure exchange device can be used to recover energy from a pressurized stream. Those of ordinary skill in the art are familiar with pressure exchange devices, in which pressure energy from a high pressure fluid stream is transferred to a low pressure fluid stream. An exemplary type of pressure exchange device is a rotary pressure exchanger, for example, as described in U.S. Pat. No. 7,306,437. For example, in some embodiments, energy (e.g., as direct hydraulic pressure) can be recovered by directly contacting a pressurized stream with a stream at a lower pressure, such that the lower pressure stream is pressurized and the higher pressure stream is depressurized (e.g., throttled). Energy can also be recovered in the system using other devices such as, for example, a turbine (e.g., a Pelton wheel).

As noted above, certain embodiments comprise reducing the pressure of at least one retentate product stream from an osmotic membrane separator. For example, some embodiments comprise, after transporting at least a portion of the monovalent-ion-enriched stream across an osmotic membrane, reducing a pressure of the monovalent-ion-enriched product stream. For example, referring to FIG. 1A, in some embodiments, after transporting at least a portion of monovalent-ion-enriched stream 150 across second side 134 of osmotic membrane 130 to produce monovalent-ion-enriched product stream 170, the pressure of the monovalent-ion-enriched product stream 170 can be reduced. As another example, referring to FIGS. 2-3, in some embodiments, after transporting at least a portion of monovalent-ion-enriched stream 230 across first side 255 of osmotic membrane 250 to produce monovalent-ion-enriched product stream 280, the pressure of the monovalent-ion-enriched product stream 280 can be reduced. As yet another example, referring to FIGS. 4A-4B, in some embodiments, after transporting at least a portion of monovalent-ion-enriched stream 230 across first side 412 of osmotic membrane 411 to produce monovalent-ion-enriched product stream 280, the pressure of the monovalent-ion-enriched product stream 280 can be reduced.

Certain embodiments comprise, after transporting at least a portion of a draw product stream across an osmotic membrane, reducing a pressure of the osmotic retentate stream. For example, referring to FIG. 4A, in some embodiments, after transporting at least a portion of stream 430 across first side 255 of osmotic membrane 250 to produce product stream 432, the pressure of product stream 432 can be reduced. As another example, referring to FIG. 4B, in some embodiments, after transporting at least a portion of draw product stream 416 across first side 422 of osmotic membrane 421 to produce product stream 423, the pressure of product stream 423 can be reduced. As yet another example, referring to FIG. 4B, in some embodiments, after transporting at least a portion of 430 across first side 255 of osmotic membrane 250 to produce product stream 432, the pressure of product stream 432 can be reduced.

Figure 5A:
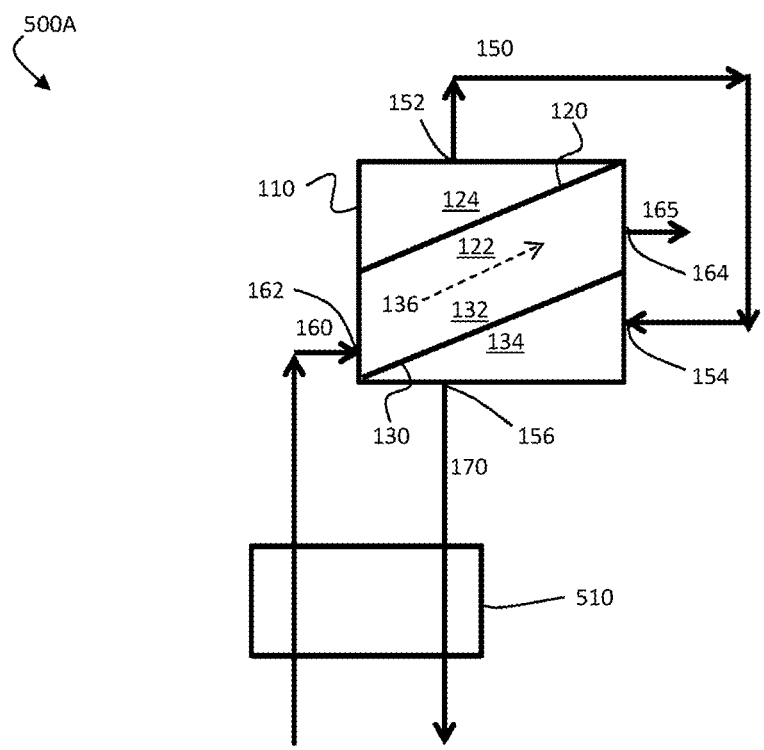
FIG. 5A is a schematic illustration of a system comprising an ion-selective membrane and an osmotic membrane, in which pressure exchange is used to pressurize an aqueous feed stream, according to some embodiments.
Figure 5B:
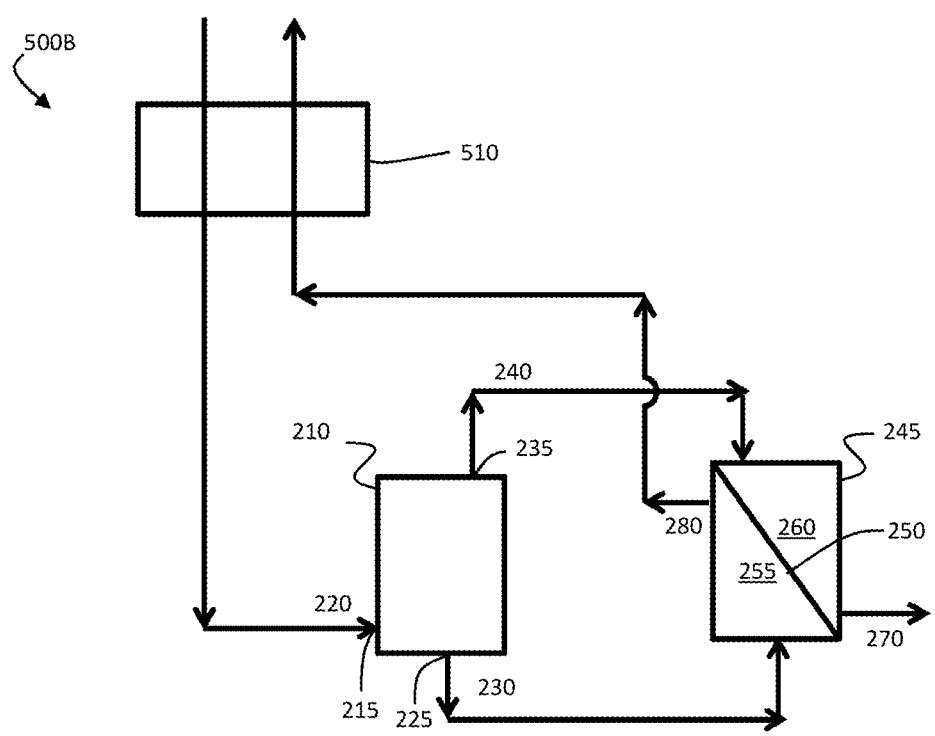
FIG. 5B is a schematic illustration of a system comprising an ion-selective separator and an osmotic membrane separator, in which pressure exchange is used to pressurize an aqueous feed stream, according to some embodiments.

Certain embodiments comprise recovering at least a portion of the energy released by reducing the pressure of at least one retentate product stream from an osmotic membrane separator. The recovered energy can be used, according to certain embodiments, to increase the pressure of at least one inlet stream to the retentate side of an ion-selective membrane separator and/or to increase the pressure of at least one inlet stream to the retentate side of an osmotic membrane separator. For example, in some embodiments, the recovered energy is used to increase the pressure of the aqueous feed stream before it is transported into the ion-selective separator. For example, referring to FIGS. 1A, 2, 3, and 4A-4B, in some embodiments, at least a portion of the energy released by reducing the pressure of a retentate product stream from an osmotic membrane separator can be used to pressurize aqueous feed stream 160. FIG. 5A is a schematic illustration of system 500A, which includes one example of such pressurization. In FIG. 5A, pressure exchange device 510 is used to recover pressure from stream 170 and to pressurize aqueous feed stream 160 before aqueous feed stream 160 is transported into inlet 162. FIG. 5B is a schematic illustration of system 500B, which includes another example of such pressurization. In FIG. 5B, pressure exchange device 510 is used to recover pressure from stream monovalent-ion-enriched product stream 280 and to pressurize aqueous feed stream 220 before aqueous feed stream 220 is transported into inlet ion-selective separator 210.

The systems and methods described herein can be used to process a variety of aqueous feed streams. As noted above, the aqueous feed stream fed to the system generally contains both solubilized monovalent ions and solubilized multivalent ions. For example, referring to FIG. 1A, aqueous feed stream 160 can comprise at least one solubilized monovalent ion species and at least one solubilized multivalent ion species. As another example, referring to FIGS. 2, 3, and 4A-4B, aqueous feed stream 220 can comprise at least one solubilized monovalent ion species and at least one solubilized multivalent ion species. The solubilized ion(s) may originate, for example, from a salt that has been dissolved in the aqueous stream. A solubilized ion is generally an ion that has been solubilized to such an extent that the ion is no longer ionically bonded to a counter-ion. The aqueous feed stream can comprise any of a number of solubilized ion species including, but not limited to, $Na^+$, $Mg^{2+}$, $Ca^{2+}$, $Sr^{2+}$, $Ba^{2+}$, $Cl^-$, carbonate anions, bicarbonate anions, sulfate anions, bisulfate anions, and/or dissolved silica. In some embodiments, the aqueous feed stream comprises at least one solubilized monovalent cation (i.e., a cation with a redox state of +1 when solubilized). For example, in some embodiments, the aqueous feed stream comprises $Na^+$ and/or $K^+$. In certain embodiments, the aqueous feed stream comprises at least one solubilized monovalent anion (i.e., an anion having redox state of −1 when solubilized). For example, in some embodiments, the aqueous feed stream comprises $Cl^-$ and/or $Br^-$. In some embodiments, the aqueous feed stream comprises at least one solubilized monovalent cation and at least one solubilized monovalent anion. In some embodiments, the aqueous feed stream comprises one or more divalent cations (i.e., a cation with a redox state of +2 when solubilized) and/or one or more divalent anions (i.e., an anion with a redox state of −2 when solubilized). In certain embodiments, the aqueous feed stream comprises at least one of $Mg^{2+}$, $Ca^{2+}$, $Sr^{2+}$, $Ba^{2+}$, and sulfate anions. In some embodiments, the aqueous feed stream comprises at least one of $Mg^{2+}$, $Ca^{2+}$, and sulfate anions. Cations and/or anions having other valencies may also be present in the aqueous feed stream, in some embodiments.

In some embodiments, the total concentration of solubilized ions in the aqueous feed stream fed to the system (e.g., stream 160 fed to system 100 in FIG. 1A; stream 220 fed to ion-selective separator 210 in FIGS. 2, 3, and 4A-4B) can be relatively high. As noted elsewhere, one advantage associated with certain embodiments is that initial aqueous feed streams with relatively high solubilized ion concentrations can be desalinated without the use of energy intensive desalination methods.

In certain embodiments, the total concentration of solubilized ions in the aqueous feed stream transported to the ion-selective separator is at least about 60,000 ppm, at least about 80,000 ppm, or at least about 100,000 ppm (and/or, in some embodiments, up to about 500,000 ppm, or more). Aqueous feed streams with solubilized ion concentrations outside these ranges could also be used. For example, in some embodiments, the total concentration of solubilized ions in the aqueous feed stream transported to the ion-selective separator is as little as 10,000 ppm, 1000 ppm, 100 ppm, or less.

In certain embodiments, the total concentration of solubilized monovalent ions in the aqueous feed stream transported to the ion-selective separator is at least about 60,000 ppm, at least about 80,000 ppm, or at least about 100,000 ppm (and/or, in some embodiments, up to about 500,000 ppm, or more). Aqueous feed streams with solubilized monovalent ion concentrations outside these ranges could also be used. For example, in some embodiments, the total concentration of solubilized monovalent ions in the aqueous feed stream transported to the ion-selective separator is as little as 10,000 ppm, 1000 ppm, 100 ppm, or less.

In certain embodiments, the total concentration of solubilized multivalent ions in the aqueous feed stream transported to the ion-selective separator is at least about 60,000 ppm, at least about 80,000 ppm, or at least about 100,000 ppm (and/or, in some embodiments, up to about 500,000 ppm, or more). Aqueous feed streams with solubilized multivalent ion concentrations outside these ranges could also be used. For example, in some embodiments, the total concentration of solubilized multivalent ions in the aqueous feed stream transported to the ion-selective separator is as little as 10,000 ppm, 1000 ppm, 100 ppm, or less.

In certain embodiments, the total concentration of solubilized monovalent ions in the monovalent-ion-enriched stream exiting the ion-selective separator (e.g., exiting an ion-selective membrane) is at least about 60,000 ppm, at least about 80,000 ppm, or at least about 100,000 ppm (and/or, in some embodiments, up to about 500,000 ppm, or more). Monovalent-ion-enriched streams with solubilized monovalent ion concentrations outside these ranges could also be used. For example, in some embodiments, the total concentration of solubilized monovalent ions in the monovalent-ion-enriched stream exiting the ion-selective separator (e.g., exiting an ion-selective membrane) is as little as 10,000 ppm, 1000 ppm, 100 ppm, or less.

In certain embodiments, the total concentration of solubilized multivalent ions in the multivalent-ion-enriched stream exiting the ion-selective separator (e.g., exiting an ion-selective membrane) is at least about 60,000 ppm, at least about 80,000 ppm, or at least about 100,000 ppm (and/or, in some embodiments, up to about 500,000 ppm, or more). Multivalent-ion-enriched streams with solubilized multivalent ion concentrations outside these ranges could also be used. For example, in some embodiments, the total concentration of solubilized multivalent ions in the multivalent-ion-enriched stream exiting the ion-selective separator (e.g., exiting an ion-selective membrane) is as little as 10,000 ppm, 1000 ppm, 100 ppm, or less.

In some embodiments, the aqueous feed stream can be derived from seawater, ground water, brackish water, and/or the effluent of a chemical process. In the oil and gas industry, for example, one type of aqueous feed stream that may be encountered is produced water (e.g., water that emerges from oil or gas wells along with the oil or gas). Due to the length of time produced water has spent in the ground, and due to high subterranean pressures and temperatures that may increase the solubility of certain salts and minerals, produced water often comprises relatively high concentrations of dissolved salts and minerals. For example, some produced water streams may comprise a supersaturated solution of dissolved strontium sulfate ($SrSO_4$). In contrast, another type of aqueous feed stream that may be encountered in the oil and gas industry is flowback water (e.g., water that is injected as a fracking fluid during hydraulic fracturing operations and subsequently recovered). Flowback water often comprises a variety of constituents used in fracking, including surfactants, proppants, and viscosity reducing agents, but often has a lower salinity than produced water. In some cases, the systems and methods described herein can be used to produce multivalent-ion-enriched streams from aqueous feed streams comprising and/or derived from such process streams.

According to certain embodiments, the aqueous feed stream comprises a suspended and/or emulsified immiscible phase. Generally, a suspended and/or emulsified immiscible phase is a material that is not soluble in water to a level of more than 10% by weight at the temperature and other conditions at which the stream is operated. In some embodiments, the suspended and/or emulsified immiscible phase comprises oil and/or grease. The term "oil" generally refers to a fluid that is more hydrophobic than water and is not miscible or soluble in water, as is known in the art. Thus, the oil may be a hydrocarbon in some embodiments, but in other embodiments, the oil may comprise other hydrophobic fluids. In some embodiments, at least about 0.1 wt %, at least about 1 wt %, at least about 2 wt %, at least about 5 wt %, or at least about 10 wt % (and/or, in some embodiments, up to about 20 wt %, up to about 30 wt %, up to about 40 wt %, up to about 50 wt %, or more) of the aqueous feed stream is made up of a suspended and/or emulsified immiscible phase.

It can be undesirable, according to certain embodiments, to allow certain suspended and/or emulsified immiscible phases to enter the system. For example, in certain embodiments in which ion-selective membranes are employed, the membranes can be made of a material (e.g., polysulfones, polyethersulfone) that can be damaged when they are exposed to oil and/or other hydrocarbons. Osmotic membranes can also be damaged when exposed to such chemicals. Accordingly, removal of the oil and/or other hydrocarbons upstream of the system can be desirable.

Accordingly, certain embodiments comprise removing at least a portion of a suspended or emulsified immiscible phase from the aqueous feed stream before the aqueous feed stream is transported to an ion-selective separator and/or an ion-selective membrane. In certain embodiments, the system is configured such that little or none of the suspended and/or emulsified immiscible phase is transported to the ion-selective separator and/or an ion-selective membrane.

Figure 6A:
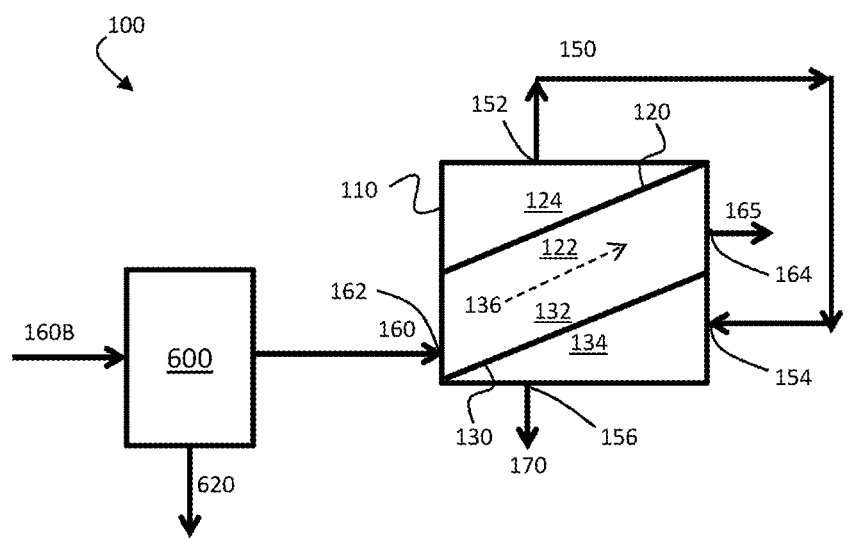
FIG. 6A is, according to certain embodiments, a schematic illustration of a system comprising a water-immiscible phase separator, an ion-selective membrane, and an osmotic membrane.

For example, in some embodiments, a water-immiscible phase separator can be configured to remove at least a portion of (e.g., at least about 50%, at least about 75 wt %, at least about 90 wt %, at least about 95 wt %, at least about 99 wt %, or more) of the suspended and/or emulsified immiscible phase from the aqueous feed stream before the aqueous feed stream is transported to the ion-selective membrane. FIG. 6A is an exemplary schematic illustration of a system 100 in which water-immiscible phase separator 600 is used to remove at least a portion of a suspended and/or emulsified immiscible phase from aqueous feed stream 160B to produce aqueous feed stream 160. The water-immiscible phase separator illustrated in FIG. 6A can be used, for example, to remove at least a portion of the suspended and/or emulsified immiscible phase before the aqueous feed stream is transported to any of the systems illustrated in FIGS. 1A and 5A.

Figure 6B:
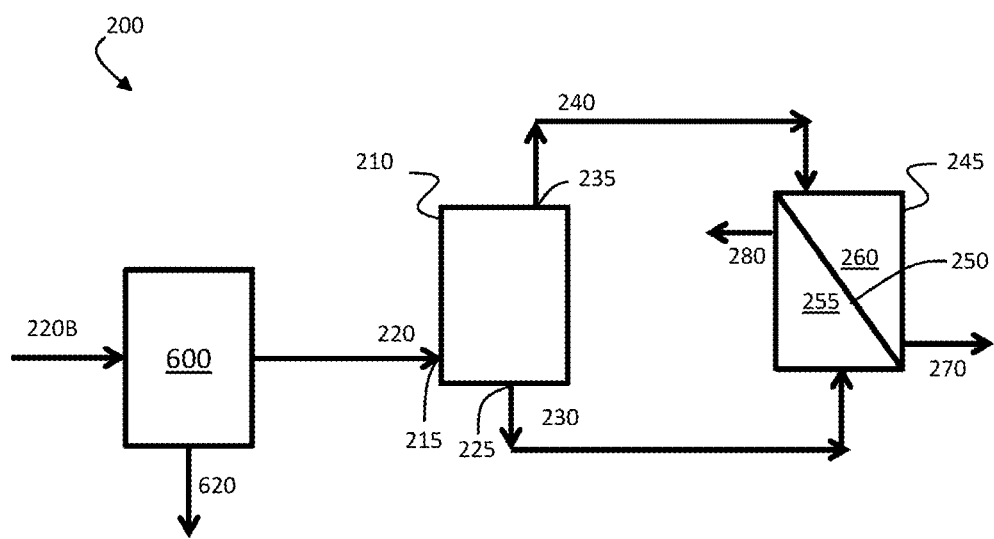
FIG. 6B is, according to some embodiments, a schematic illustration of a system comprising a water-immiscible phase separator, an ion-selective separator, and an osmotic membrane separator.

In certain embodiments, a water-immiscible phase separator can be configured to remove at least a portion of (e.g., at least about 50%, at least about 75 wt %, at least about 90 wt %, at least about 95 wt %, at least about 99 wt %, or more) of the suspended and/or emulsified immiscible phase from the aqueous feed stream before the aqueous feed stream is transported to the ion-selective separator. FIG. 6B is an exemplary schematic illustration of a system 100 in which water-immiscible phase separator 600 is used to remove at least a portion of a suspended and/or emulsified immiscible phase from aqueous feed stream 220B to produce aqueous feed stream 220. The water-immiscible phase separator illustrated in FIG. 6B can be used, for example, to remove at least a portion of the suspended and/or emulsified immiscible phase before the aqueous feed stream is transported to any of the systems illustrated in FIGS. 2, 3, 4A-4B, and 5B.

In certain embodiments, the water-immiscible phase separator can be configured to output an aqueous feed stream (e.g., to an ion-selective membrane and/or an ion-selective membrane separator) having a concentration of suspended and/or emulsified immiscible phase(s) of less than about 10 ppm, less than about 1 ppm, or less than about 0.1 ppm. In certain embodiments, the water-immiscible phase separator can be configured to output an aqueous feed stream (e.g., to an ion-selective membrane and/or an ion-selective membrane separator) having a concentration of oil of less than about 10 ppm, less than about 1 ppm, or less than about 0.1 ppm.

Optionally, the water-immiscible phase separator can produce an immiscible-phase-rich stream, which can contain at least a portion (or all) of the immiscible phase that is separated from the aqueous feed stream. For example, in FIG. 6A, water-immiscible phase separator 600 can produce optional immiscible-phase-rich stream 620, according to certain embodiments. As another example, in FIG. 6B, water-immiscible phase separator 600 can produce optional immiscible-phase-rich stream 620, according to certain embodiments.

While the water-immiscible phase separator can be used to separate a suspended and/or emulsified immiscible phase from an incoming aqueous feed stream, such separation is optional. For example, in some embodiments, the aqueous feed stream transported to the system is substantially free of a suspended and/or emulsified immiscible phase, or it contains an amount of suspended and/or emulsified immiscible phase that is sufficiently low that acceptable operation of the system can be obtained without using a water-immiscible phase separator.

A variety of water-immiscible phase separators are suitable for use according to certain of the embodiments described herein. In some embodiments, the water-immiscible phase separator at least partially separates the immiscible phase from the aqueous stream via gravity, centrifugal force, adsorption, and/or using a barrier. In some embodiments, the water-immiscible phase separator comprises a hydrocyclone, such as a de-oiling hydrocyclone. In some embodiments, the hydrocyclone can be configured to remove droplets of the immiscible phase having a diameter of greater than about 10 micrometers. In certain embodiments, the water-immiscible phase separator comprises a corrugated plate interceptor. In some embodiments, the corrugated plate interceptor can be configured to remove droplets of the immiscible phase having a diameter of greater than about 50 micrometers. In some embodiments, the water-immiscible phase separator comprises an adsorption media filter. The adsorption media filter can contain an adsorption medium. The adsorption medium may comprise, for example, walnut shells. In some embodiments, the adsorption media filter can be configured to remove droplets of the immiscible phase having a diameter of greater than about 150 micrometers. The water-immiscible phase separator comprises, according to certain embodiments, a coalescing media filter. The coalescing media filter can be configured, in some embodiments, to remove droplets of the immiscible phase having a diameter of less than about 2 micrometers. In some embodiments, the water-immiscible phase separator comprises a membrane filter. In certain embodiments, the membrane filter can be configured to remove droplets of the immiscible phase having a diameter of less than about 1 micrometer. In certain embodiments, the water-immiscible phase separator comprises a settling zone in which water and the immiscible phase are at least partially physically separated. The settling zone may comprise, for example, a crystallization tank (which can be, in some embodiments, a settling tank). As one example, the water-immiscible phase separator may comprise, according to certain embodiments, an American Petroleum Institute separator, commonly referred to as API separators. In some embodiments, the API separator can be configured to remove droplets of the immiscible phase having a diameter of greater than about 150 micrometers. According to some embodiments, the water-immiscible phase separator comprises a skimmer. In some embodiments, the water-immiscible phase separator comprises a dissolved gas floatation (DGF) apparatus. In certain embodiments, the water-immiscible phase separator comprises an induced gas flotation (IGF) apparatus. In some embodiments, the DGF and/or IGF apparatus can be configured to remove droplets of the immiscible phase having a diameter of greater than about 20 micrometers.

Certain embodiments are related to producing multivalent-ion-enriched streams for use in oil recovery. Oil reservoirs generally include porous rocks, the pores of which may contain oil. In some cases, injection of water rich in solubilized multivalent ions can aid in the extraction of oil from such pores. Accordingly, some embodiments comprise injecting a multivalent-ion-enriched product stream (e.g., any of the multivalent-ion-enriched product streams described herein) into a subterranean space. The subterranean space may comprise, for example, oil contained within the pores of a porous material (e.g., porous rocks or other porous materials). In certain embodiments, the subterranean space may be part of an oil well. In certain embodiments, the multivalent-ion-enriched stream that is injected into the subterranean space can be injected under pressure (e.g., under a gauge pressure of at least about 1 bar, at least about 2 bar, at least about 5 bar, at least about 10 bar, at least about 25 bar, or more). Certain embodiments can comprise recovering at least a portion of the monovalent-ion-enriched stream from the subterranean space. In certain embodiments, the aqueous feed stream used in the system (e.g., any of the aqueous feed streams described herein) can comprise at least a portion of the monovalent-ion-enriched stream recovered from the subterranean space.

Various components are described herein as being either directly fluidically connected or indirectly fluidically connected. Generally, a direct fluidic connection exists between a first region and a second region (and the two regions are said to be directly fluidically connected to each other) when they are fluidically connected to each other and when the composition of the fluid at the second region of the fluidic connection has not substantially changed relative to the composition of the fluid at the first region of the fluidic connection (i.e., no fluid component that was present in the first region of the fluidic connection is present in a weight percentage in the second region of the fluidic connection that is more than 5% different from the weight percentage of that component in the first region of the fluidic connection). As an illustrative example, a stream that connects first and second unit operations, and in which the pressure and temperature of the fluid is adjusted but the composition of the fluid is not altered, would be said to directly fluidically connect the first and second unit operations. If, on the other hand, a separation step is performed and/or a chemical reaction is performed that substantially alters the composition of the stream contents during passage from the first component to the second component, the stream would not be said to directly fluidically connect the first and second unit operations. In some embodiments, a direct fluidic connection between a first region and a second region can be configured such that the fluid does not undergo a phase change from the first region to the second region. In some embodiments, the direct fluidic connection can be configured such that at least about 50 wt % (or at least about 75 wt %, at least about 90 wt %, at least about 95 wt %, or at least about 98 wt %) of the fluid in the first region is transported to the second region via the direct fluidic connection.

Certain components (e.g., sides of membranes) are described according to certain embodiments as facing other components (e.g., sides of other membranes). As used herein, a surface (or surface portion) is said to be "facing" an object when any line extending normal to the surface and away from the bulk of the material comprising the surface intersects the object. For example, a first surface would be facing a second surface if a line normal to the first surface and extending away from the bulk of the material comprising the first surface intersects the second surface. A surface can be facing another object when it is in contact with the other object, or when one or more intermediate materials are positioned between the surface and the other object. For example, two surfaces that are facing each other can be in contact or can include one or more intermediate materials between them.

U.S. Provisional Patent Application Ser. No. 62/205,633, filed Aug. 14, 2015 and entitled "Selective Retention of Multivalent Ions" is incorporated herein by reference in its entirety for all purposes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system, comprising:
    a housing;
    an ion-selective membrane positioned at least partially within the housing, the ion-selective membrane having a first side and a second side;
    an osmotic membrane positioned at least partially within the housing, the osmotic membrane having a first side facing the first side of the ion-selective membrane, and a second side, wherein at least a portion of the first side of the ion-selective membrane and at least a portion of the first side of the osmotic membrane define a flow pathway between the ion-selective membrane and the osmotic membrane; and
    a conduit fluidically connecting the second side of the ion-selective membrane to the second side of the osmotic membrane.

2. The system of claim 1, wherein the conduit directly fluidically connects the second side of the ion-selective membrane to the second side of the osmotic membrane.

3. The system of claim 1, wherein the shortest distance between a facial surface the first side of the ion-selective membrane and a facial surface of the first side of the osmotic membrane is less than about 1 cm.

4. The system of claim 1, wherein the ion-selective membrane has a molecular weight cut off of at least about 200 Da.

5. The system of claim 1, wherein the ion-selective membrane is a nanofiltration membrane.

6. The system of claim 1, wherein the osmotic membrane has a molecular weight cut off of 100 Da or less.

7. The system of claim 1, comprising a pressure exchange device fluidically connected to the first side of the osmotic membrane and the second side of the osmotic membrane.

8. The system of claim 7, wherein the pressure exchange device is configured to increase the pressure of a stream entering the flow pathway using at least a portion of the pressure of an outlet stream from the second side of the osmotic membrane.

9. The system of claim 1, comprising a water-immiscible phase separator fluidically connected to the flow pathway between the ion-selective membrane and the osmotic membrane.

\* \* \* \* \*